(12) United States Patent
Boul et al.

(10) Patent No.: US 10,544,346 B2
(45) Date of Patent: Jan. 28, 2020

(54) CONSTITUTIONALLY DYNAMIC POLYMER FOR TREATMENT OF SUBTERRANEAN FORMATIONS

(71) Applicant: Halliburton Energy Services, Inc., Houston, TX (US)

(72) Inventors: Peter James Boul, Houston, TX (US); Jay Paul Deville, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 113 days.

(21) Appl. No.: 15/542,634

(22) PCT Filed: Feb. 11, 2015

(86) PCT No.: PCT/US2015/015406
§ 371 (c)(1),
(2) Date: Jul. 10, 2017

(87) PCT Pub. No.: WO2016/130118
PCT Pub. Date: Aug. 18, 2016

(65) Prior Publication Data
US 2018/0265761 A1  Sep. 20, 2018

(51) Int. Cl.
*C09K 8/035* (2006.01)
*C09K 8/487* (2006.01)
*C09K 8/508* (2006.01)

(52) U.S. Cl.
CPC .............. *C09K 8/035* (2013.01); *C09K 8/487* (2013.01); *C09K 8/5086* (2013.01); *C09K 2208/02* (2013.01); *C09K 2208/08* (2013.01); *C09K 2208/24* (2013.01); *C09K 2208/26* (2013.01); *C09K 2208/32* (2013.01)

(58) Field of Classification Search
None
See application file for complete search history.

(56) References Cited

U.S. PATENT DOCUMENTS

| | | | | |
|---|---|---|---|---|
| 5,278,248 A | * | 1/1994 | Egraz | A61K 8/8147 524/1 |
| 5,372,732 A | | 12/1994 | Harris et al. | |
| 7,229,492 B2 | | 6/2007 | Chatterji et al. | |
| 9,695,353 B2 | * | 7/2017 | Nelson | C09K 8/703 |

(Continued)

FOREIGN PATENT DOCUMENTS

| | | |
|---|---|---|
| WO | 2012022399 | 2/2012 |
| WO | 2013055213 | 4/2013 |
| WO | 2014004145 | 1/2014 |

OTHER PUBLICATIONS

"A Theory of Healing at a Polymer-Polymer Interface" by Kim et al. Published in 1983.

(Continued)

*Primary Examiner* — John J Figueroa
(74) *Attorney, Agent, or Firm* — Tenley Krueger; C. Tumey Law Group PLLC

(57) ABSTRACT

Various embodiments disclosed relate to constitutionally dynamic polymer for treatment of subterranean formations. In various embodiments, the present invention provides a method of treating a subterranean formation, the method including placing in the subterranean formation a composition including a constitutionally dynamic polymer.

15 Claims, 8 Drawing Sheets

(56) References Cited

U.S. PATENT DOCUMENTS

| | | | |
|---|---|---|---|
| 2008/0302570 A1* | 12/2008 | deBoer | E21B 21/001 175/25 |
| 2009/0143257 A1 | 6/2009 | Teng et al. | |
| 2011/0155374 A1 | 6/2011 | Mackay | |
| 2012/0321828 A1 | 12/2012 | Jolley et al. | |
| 2013/0153229 A1 | 6/2013 | Schlubmberger | |
| 2016/0237302 A1* | 8/2016 | Tristram | C08G 12/00 |
| 2017/0247296 A1* | 8/2017 | Salla | C09K 8/44 |

OTHER PUBLICATIONS

"Self-healing of Unentangled Polymer Networks with Reversible Bonds." by Stukalin et al. Published in 2013.

"Bond Scrambling and Network Elasticity" by Ciferri. Published in 2009.

"Room Temperature Dynamic Polymers Based in Diels-Alder Chemistry" by Reutenauer et al. Published in 2009.

"Self-healing and thermoreversible rubber from supramolecular assembly" by Cordier et al. Published in 2008.

"Self-Healing Materials Based on Disulfide Links" by Canadell et al. Published in 2011.

"Catalyst-free room-temperature self-healing elastomers based on aromatic disulfide metathesis" by Rekondo et al. Published in 2014.

International Search Report and Written Opinion for PCT/US2015/015406 dated Aug. 28, 2015.

Martin et al., "The processability of a poly(urea-urethane) elastomer reversibly crosslinked with aromatic disulfide bridges," J. Mater. Chem. A, 20104, vol. 2, pp. 5710-5715 (first published on Feb. 6, 2014).

AU Examination Report for Application No. 2014415572 dated Nov. 23, 2017.

* cited by examiner

CONSTITUTIONALLY DYNAMIC POLYMER FOR TREATMENT OF SUBTERRANEAN FORMATIONS

BACKGROUND

During subterranean drilling procedures, lower-resistance pathways can be encountered, such as fissures, fractures, or caverns, which can cause problematic drilling fluid loss. Fluid loss control materials can be added to drilling muds to reduce or eliminate fluid loss. However, many fluid loss control materials are expensive, inconvenient to use, or less effective than needed.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
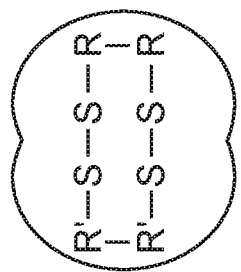
FIG. 1 illustrates a constitutionally dynamic polymer, in accordance with various embodiments.
Figure 1:
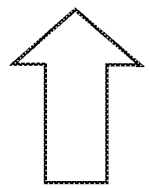
Figure 1:
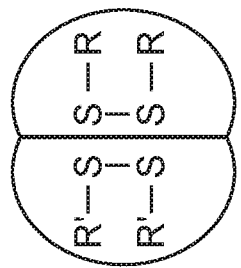
Figure 1:
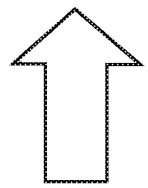
Figure 1:
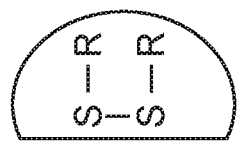
Figure 1:
Figure 1:
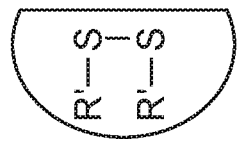

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000,1" is equivalent to "0.0001."

In the methods of manufacturing described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, within 1%, or within 0% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can itself be substituted or unsubstituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Non-limiting examples of solvents are silicones, organic compounds, water, alcohols, ionic liquids, and supercritical fluids.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number-average molecular weight ($M_n$) is determined by analyzing a sample divided into molecular weight fractions of species i having $n_i$ molecules of molecular weight $M_i$ through the formula $M_n = \Sigma M_i n_i / \Sigma n_i$. The number-average molecular weight can be measured by a variety of well-known methods including gel permeation chromatography, spectroscopic end group analysis, and osmometry. If unspecified, molecular weights of polymers given herein are number-average molecular weights.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product or fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or non ial-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The polymers described herein can terminate in any suitable way. In some embodiments, the polymers can terminate with an end group that is independently chosen from a suitable polymerization initiator, —H, —OH, a substituted or unsubstituted ($C_1$-$C_{20}$)hydrocarbyl (e.g., ($C_1$-$C_{10}$)alkyl or ($C_6$-$C_{20}$)aryl) interrupted with 0, 1, 2, or 3 groups independently selected from —O—, substituted or unsubstituted —NH—, and —S—, a poly(substituted or unsubstituted ($C_1$-$C_{20}$)hydrocarbyloxy), and a poly(substituted or unsubstituted ($C_1$-$C_{20}$)hydrocarbylamino).

In various embodiments, the present invention provides a method of treating a subterranean formation. The method includes placing in the subterranean formation a composition including a constitutionally dynamic polymer.

In various embodiments, the present invention provides a method of treating a subterranean formation. The method includes placing in the subterranean formation a drilling fluid including a constitutionally dynamic polymer. The constitutionally dynamic polymer is at least one of a lost-circulation material and a fluid loss control additive. About 0.01 wt % to about 50 wt % of the drilling fluid is the constitutionally dynamic polymer. The constitutionally dynamic polymer has the following structure:

M$\leftarrow$Y$)_a$.

At each occurrence M independently has the structure:

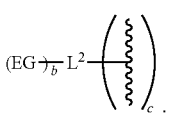

At each occurrence —Y independently has the structure:

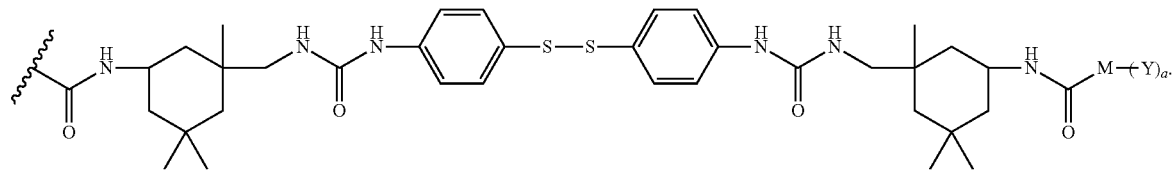

At each occurrence the variable $L^2$ independently has the structure:

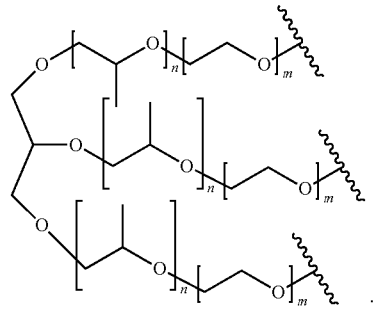

At each occurrence n is independently 0 to 500. At each occurrence m is independently 0 to 500. Each $L^2$ includes at least one of the propoxy groups having degree of polymerization n and at least one of the ethoxy groups having degree of polymerization m. At each occurrence the group $L^2$ independently has a molecular weight of about 250 to about 100,000. At each occurrence EG is independently chosen from —H and a substituted or unsubstituted ($C_1$-$C_{20}$)hydrocarbyl interrupted by 0, 1, 2, or 3 groups independently chosen from —O—, —S—, and substituted or unsubstituted —NH—. At each occurrence the variable a is independently 0 to 3. At each occurrence of M, b+c is 3. The constitutionally dynamic polymer has at least two disulfide groups.

In various embodiments, the present invention provides a system including a composition including a constitutionally dynamic polymer. The system also includes a subterranean formation including the composition therein.

In various embodiments, the present invention provides a composition for treatment of a subterranean formation. The composition includes a constitutionally dynamic polymer.

In various embodiments, the present invention provides a drilling fluid composition for treatment of a subterranean formation. The drilling fluid includes a constitutionally dynamic polymer including at least one disulfide linkage. The constitutionally dynamic polymer is at least one of a lost-circulation material and a fluid loss control additive. About 0.01 wt % to about 50 wt % of the drilling fluid is the constitutionally dynamic polymer. The constitutionally dynamic polymer has the following structure:

M$\leftarrow$Y$)_a$.

At each occurrence M independently has the structure:

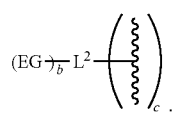

At each occurrence —Y independently has the structure:

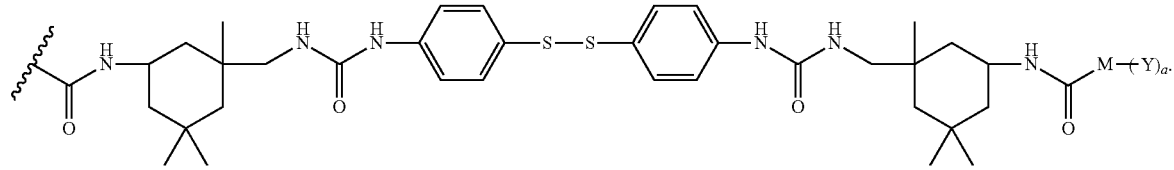

At each occurrence $L^2$ independently has the structure:

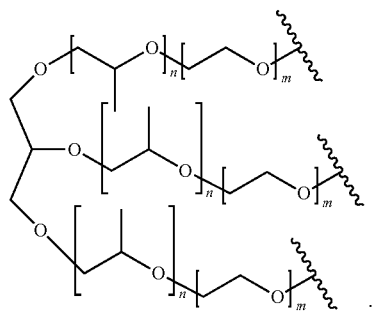

At each occurrence n is independently 0 to 500. At each occurrence m is independently 0 to 500. Each $L^2$ includes at least one of the propoxy groups having degree of polymerization n and at least one of the ethoxy groups having degree of polymerization m. At each occurrence the group $L^2$ independently has a molecular weight of about 250 to about 100,000. At each occurrence EG is independently chosen from —H and a substituted or unsubstituted $(C_1$-$C_{20})$hydrocarbyl interrupted by 0, 1, 2, or 3 groups independently chosen from —O—, —S—, and substituted or unsubstituted —NH—. At each occurrence the variable a is independently 0 to 3. At each occurrence of M, b+c is 3. The constitutionally dynamic polymer has at least two disulfide groups.

In various embodiments, the present invention provides a method of preparing a composition for treatment of a subterranean formation. The method includes forming a composition including a constitutionally dynamic polymer.

In various embodiments, the present invention provides certain advantages over other fluid loss control materials and methods of using the same, at least some of which are unexpected. For example, in various embodiments, the constitutionally dynamic polymer can be less expensive than other fluid loss control materials. In various embodiments, the constitutionally dynamic polymer can be more effective than other fluid loss control materials, providing more effective bridging or plugging or porous or fractured subterranean formations. In various embodiments, the constitutionally dynamic polymer can be easier to use under a wider variety of conditions than other fluid loss control materials.

Some fluid loss control materials rely on utilization of temperature, which can have challenging reaction kinetics issues and can require detailed knowledge of the downhole temperature. Some fluid loss control materials are stimuli-responsive and rely on an added material downhole to trigger control of fluid loss. In various embodiments, the constitutionally dynamic polymer can provide effective fluid loss control by relying on simple contact between particles of the polymer, without requiring specific temperature conditions or specific added stimuli.

In various embodiments, the constitutionally dynamic polymer can generate a better seal than other fluid loss control materials because the touching particles will covalently link. Other fluid loss control particles (even swollen polymers) cannot do this and instead rely only on individual particles plugging the various pore spaces of a formation. In various embodiments, the constitutionally dynamic polymer can be tougher and can heal if damage was applied to the filter cake, preventing losses. In contrast, with other fluid loss control materials, any damage or holes in the filter cake would allow fluid through.

Method of Treating a Subterranean Formation.

Various embodiments of the present invention provide methods of treating a subterranean formation with a constitutionally dynamic polymer. In some embodiments, the constitutionally dynamic polymer includes at least one disulfide group. The constitutionally dynamic polymer can serve as a lost-circulation material or a fluid loss control additive, such as for drilling fluids. A constitutionally dynamic polymer includes constituents which are joined together reversibly through molecular or supramolecular bonding. The bonds are inherently labile (under certain environmental conditions), enabling scrambling/shuffling of the primary, secondary, and tertiary structure of the dynamic polymer through its monomer, dimer, and/or oligomer constituents. The shuffling of components can also occur between strands of separate polymers and/or across interfaces of two polymeric materials. The environmental conditions can provide a stimulus for constituent scrambling. The stimulus can be heat (the dynamics may occur above a given temperature), pressure, pH, through chemical association or disassociation, light, sound, electric field, magnetic field, or mechanical shear. The stimulus can serves as a trigger for bond dynamics within and beyond the polymer. A constitutionally dynamic polymer can be considered a self-healing polymer.

In some embodiments, deployment of discrete polymeric particles of the constitutionally dynamic polymer within the composition and subsequent confinement of the particles into close proximity (via a suitable confining pressure such as in a fracture or filter cake) can spontaneously lead to bonding of one polymeric particle to another on contact, forming a low to no permeability bridge. FIG. 1 illustrates a disulfide-containing constitutionally dynamic polymer that has been cut in half. When the two pieces of the polymer are rejoined, the polymer particles re-unify via an intermolecular disulfide rearrangement, which can include breaking and totaling covalent bonds.

In some embodiments, the present invention provides a method of treating a subterranean formation. The method includes placing the composition including the constitutionally dynamic polymer in a subterranean formation. The placing of the composition in the subterranean formation can include contacting the composition and any suitable part of the subterranean formation, or contacting the composition and a subterranean material, such as any suitable subterranean material. The subterranean formation can be any suitable subterranean formation. The placing of the composition in the subterranean formation can be any suitable placing and can include any suitable contacting between the subterranean formation and the composition. The obtaining or providing of the composition can occur at any suitable time and at any suitable location. The obtaining or providing of the composition can occur above the surface (e.g., the components of the composition can be combined above the surface). The obtaining or providing of the composition can occur in the subterranean formation (e.g., the components of the composition can be combined downhole).

In some embodiments, the composition can be a drilling fluid. The constitutionally dynamic polymer can have utility in a variety of downhole fluids, such as a drilling fluid, diverting fluid, spotting fluid, pill, cementing fluid, packer fluid, logging fluid, or a combination thereof. In various embodiments, the method can be a method of drilling, diverting, spotting, using a pill, cementing, using a packer fluid, logging, or a combination thereof.

The composition can include a carrier fluid. The carrier fluid can be any suitable carrier fluid. The carrier fluid can form about 0.001 wt % to about 99.999 wt % of the composition, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

In some embodiments, the method includes allowing the constitutionally dynamic polymer to self-heal in the subterranean formation. Allowing the constitutionally dynamic polymer to self-heal (e.g., rearrange) can include placing the polymer under a temperature and pressure (e.g., differential pressure between the location of the composition and the area to be plugged) sufficient to allow it to self-heal, such as to undergo an intermolecular disulfide rearrangement. The temperature sufficient for self-healing can be any suitable temperature, such as about room temperature to about 500° F., about 100° F. to about 500° F., at least about 160° F., or about room temperature or less, or about 80° F., 90, 100, 110, 120, 130, 140, 150, 160, 170, 180, 190, 200, 220, 240, 260, 280, 300, 320, 340, 360, 380, 400, 425, 450, 475, or 500° F. or more. The pressure sufficient for self-healing can be any suitable temperature, such as about standard pressure (e.g., about 14.7 psi) to about 50,000 psi, about 100 psi to about 50,000 psi, at least about 300 psi, or about 20 psi, 30, 40, 50, 60, 70, 80, 90, 100, 120, 140, 160, 180, 200, 220, 240, 260, 280, 300, 320, 340, 360, 380, 400, 450, 500, 600, 700, 800, 900, 1,000, 1,500, 2,000, 2,500, 3,000, 4,000, 5,000, 7,500, 10,000, 15,000, 20,000, 25,000, or about 50,000 psi or more. The temperature and pressure sufficient for self-healing can depend on the thermodynamics and kinetics of the constituents of the constitutionally dynamic polymer. The nature of the components can be important as the dynamics can be dictated by the energy required for their dissociation and the energy levels occupied at their association.

In various embodiments, the method can include activating the constitutionally dynamic polymer for self-healing. The activating can occur above surface, in the subterranean formation, or a combination thereof. The activating can include changing the constitutionally dynamic polymer from a state wherein the self-healing behavior is reduced or prevented to a state wherein the self-healing behavior is active. In some examples, the activating can include removing a protective coating, or making the constitutionally dynamic polymer malleable enough such that non-coated surfaces are exposed. In some examples, the activating can include deprotecting protecting groups that are adjacent healing groups in the polymer, such as adjacent to disulfide linkages in the polymer. The activating can include exposing the constitutionally dynamic polymer to conditions downhole (e.g., temperature and pressure) for a suitable time. The activating can include exposing the constitutionally dynamic polymer to an activating chemical trigger.

Constitutionally Dynamic Polymer.

The constitutionally dynamic (e.g., self-healing polymer) can be any suitable polymer such that the constitutionally dynamic polymer can be used as described herein (e.g., as an effective fluid loss control additive in a drilling fluid or other downhole fluid). The polymer can include at least one disulfide group. The polymer can be a linear polymer (e.g., when formed from a diol). The polymer can be a branched polymer (e.g., when from a polyol having more than two alcohol groups), such as a dendrimer. In some embodiments, the constitutionally dynamic polymer can be a polyurethane. Any suitable proportion of the composition including the constitutionally dynamic polymer that is placed downhole can be the constitutionally dynamic polymer, such as about 0.01 wt % to about 100 wt % of the composition, or about 0.01 wt % to about 50 wt %, or about 1 wt % to about 30 wt %, or 0.01 wt % or less, or about 0.05 wt %, 0.1, 0.5, 1, 2, 3, 4, 5, 6, 8, 10, 12, 14, 16, 18, 20, 22, 24, 26, 28, 30, 35, 40, 45, 50, 55, 60, 65, 70, 75, 80, 85, 90, 95, 96, 97, 98, 99, or about 99.9 wt % or more.

In various embodiments, the constitutionally dynamic polymer can have the following structure:

$$M(-Y)_a.$$

At each occurrence M can independently have the structure:

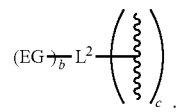

At each occurrence —Y can independently have the structure:

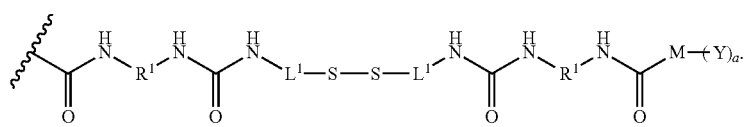

At each occurrence $R^1$ can be a substituted or unsubstituted $(C_1-C_{30})$hydrocarbylene. At each occurrence, $L^1$ can be independently chosen from a bond and a substituted or unsubstituted $(C_1-C_{30})$hydrocarbylene at least one of interrupted and terminated by 0, 1, 2, or 3 groups independently chosen from —O— and substituted or unsubstituted —NH—. At each occurrence $L^2$ can be independently chosen from a substituted or unsubstituted $(C_1-C_{1,000})$hydrocarbyl group at least one of interrupted and terminated by 0 to 500 groups independently chosen from —O— and substituted or unsubstituted —NH—, wherein $L^2$ has a valency of b+c. At each occurrence EG can be independently chosen from —H and a substituted or unsubstituted $(C_1-C_{30})$hydrocarbyl interrupted by 0, 1, 2, or 3 groups independently chosen from —O— and substituted or unsubstituted —NH—. At each occurrence the variable a can be independently 0 to 30. At each occurrence of M, b+c can be independently 2 to 30. The constitutionally dynamic polymer can have at least two disulfide groups.

At each occurrence R' can be a substituted or unsubstituted $(C_1-C_{30})$hydrocarbylene. At each occurrence $R^1$ can independently be a substituted or unsubstituted $(C_1-C_{30})$hydrocarbylene. At each occurrence $R^1$ can independently be a substituted or unsubstituted $(C_1-C_{20})$alkylene. At each occurrence $R^1$ can independently be a $(C_1-C_{20})$cycloalkylene. The variable R' can have the structure:

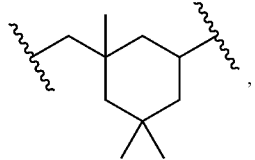 [SMILES: *CC1(C)CC(*)CC(C)(C)C1]

wherein the $R^1$ can be oriented in any suitable direction. In some embodiments, $R^1$ has the isophorone derivative structure shown and is oriented such that the end having a methyl group at the point of attachment to the cyclohexane right is oriented toward the nearest disulfide group.

At each occurrence, $L^1$ can be independently chosen from a bond and a substituted or unsubstituted $(C_1-C_{30})$hydrocarbylene at least one of interrupted and terminated by 0, 1, 2, or 3 groups independently chosen from —O— and substituted or unsubstituted —NH—. At each occurrence $L^1$ can be independently chosen from a bond and a substituted or unsubstituted $(C_1-C_{30})$hydrocarbylene. At each occurrence $L^1$ can be independently chosen from a bond and a substituted or unsubstituted $(C_6-C_{30})$arylene. At each occurrence $L^1$ can be phenylene. At each occurrence $L^1$ can have the structure:

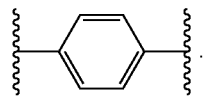

At each occurrence $L^2$ can be independently chosen from a substituted or unsubstituted $(C_1-C_{1,000})$hydrocarbyl group at least one of interrupted and terminated by 0 to 500 groups independently chosen from —O— and substituted or unsubstituted —NH—, wherein $L^2$ has a valency of b+c. At each occurrence $L^2$ can be independently chosen from a $(C_1-C_{100})$hydrocarbyltriol group at least one of interrupted and terminated by 0 to 20 groups independently chosen from —O— and substituted or unsubstituted —NH—, wherein each alcohol group of the triol is independently ethoxylated with a degree of polymerization of 0 to 500. At each occurrence $L^2$ can be independently a $(C_2-C_{10})$alkoxylated $(C_2-C_{10})$alkoxylated substituted or unsubstituted $(C_1-C_{20})$alkanepolyol, wherein each $(C_2-C_{10})$alkoxy can be independently selected. At each occurrence $L^2$ can be independently an ethoxylated propoxylated glycerol. At each occurrence $L^2$ can independently have the structure:

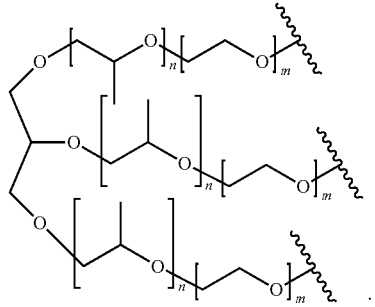

At each occurrence n can independently be 0 to 500, 0 to 100, 0 to 50, 0 to 30, or 0, 1, 2, 3, 4, 5, 6, 7, 8, 9, 10, 12, 14, 16, 18, 20, 25, 30, 35, 40, 45, 50, 60, 70, 80, 90, 100, 150, 200, 250, or 500 or more. At each occurrence m can independently be 0 to 500, 0 to 100, 0 to 50, 0 to 30, or 0, 1, 2, 3, 4, 5, 6, 7, 8, 9, 10, 12, 14, 16, 18, 20, 25, 30, 35, 40, 45, 50, 60, 70, 80, 90, 100, 150, 200, 250, or 500 or more. Each $L^2$ can include at least one of the propoxy groups having degree of polymerization n and at least one of the ethoxy groups having degree of polymerization m (e.g., each $L^2$ can include at least one propoxy group and at least one ethoxy group). The group $L^2$ can have any suitable molecular weight, such as about 250 to about 100,000, about 500 to about 50,000, about 5,000 to about 7,000, or about 250 or less, or about 300, 400, 500, 600, 700, 800, 900, 1,000, 1,200, 1,400, 1,600, 1,800, 2,000, 2,500, 3,000, 4,000, 5,000, 6,000, 7,000, 8,000, 9,000, 10,000, 12,000, 14,000, 16,000, 18,000, 20,000, 25,000, 30,000, 40,000, 50,000, 75,000, or about 100,000 or more.

End group EG can be any suitable end group. At each occurrence EG can be independently chosen from —H and a substituted or unsubstituted $(C_1-C_{30})$hydrocarbyl interrupted by 0, 1, 2, or 3 groups independently chosen from —O— and substituted or unsubstituted —NH—. At each occurrence EG can be independently chosen from —H and a substituted or unsubstituted $(C_1-C_{20})$hydrocarbyl interrupted by 0, 1, 2, or 3 groups independently chosen from —O—, —S—, and substituted or unsubstituted —NH—. At each occurrence EG can independently be chosen from —H and a $(C_1-C_{10})$hydrocarbyl. At each occurrence EG can independently be chosen from —H and a $(C_1-C_5)$alkyl.

At each occurrence the variable a can be independently 0 to 30. In some embodiments, at each occurrence the variable a can be independently 0 to 20, 0 to 10, 0 to 5, 0 to 3, or 0, 1, 2, 3, 4, 5, 6, 7, 8, 9, 10, 12, 14, 16, 18, 20, 22, 24, 26, 28, or 30 or more. In some embodiments, within a —Y, the variable a can be equal to the quantity of c−1. Each Y group eventually terminates, therefore, each Y group includes at least one a that is 0, either within the original Y group itself or within a Y group that is included in the original Y group.

At each occurrence of M, b+c (e.g., the b and c that are included in the M) can be independently 2 to 30. In some embodiments, at each occurrence of M, b+c can be independently 2 to 20, 2 to 10, 2 to 5, or 2, 3, 4, 5, 6, 7, 8, 9, 10, 12, 14, 16, 18, 20, 22, 24, 26, 28, or 30 or more. At each occurrence of M, the variable b can be independently 0 to 20, 0 to 10, 0 to 5, 0 to 3, or 0, 1, 2, 3, 4, 5, 6, 7, 8, 9, 10, 12, 14, 16, 18, 20, 22, 24, 26, 28, or 30 or more. At each occurrence of M, the variable c can be independently 0 to 20, 0 to 10, 0 to 5, 0 to 3, or 0, 1, 2, 3, 4, 5, 6, 7, 8, 9, 10, 12, 14, 16, 18, 20, 22, 24, 26, 28, or 30 or more.

In various embodiments, the constitutionally dynamic polymer can have no disulfide groups, or at least one disulfide group, or at least two disulfide groups. The constitutionally dynamic polymer can have any suitable number of disulfide groups equal to or greater than one, or equal to or greater than two. The constitutionally dynamic polymer can have about 0 to about 10,000,000 disulfide groups, or about 0, 1, 2, 3, 4, 5, 6, 7, 8, 9, 10, 12, 14, 16, 18, 20, 25, 30, 35, 40, 45, 50, 60, 70, 80, 90, 100, 125, 150, 175, 200, 250, 500, 750, 1,000, 1,250, 1,500, 2,000, 2,500, 5,000, 10,000, 15,000, 20,000, 25,000, 50,000, 100,000, 150,000, 200,000, 250,000, 500,000, 1,000,000, 2,500,000, 5,000,000, or about 10,000,000 or more disulfide groups.

In various embodiments, the constitutionally dynamic polymer can have the structure:

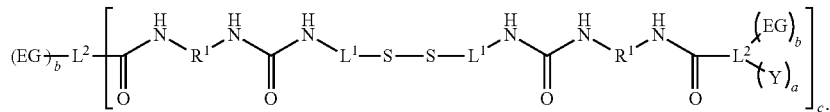

The variable —Y can have the structure:

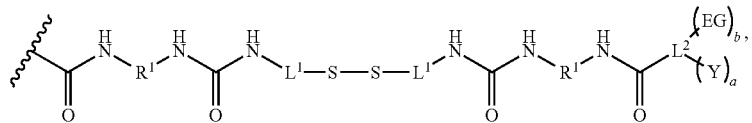

The variables $R^1$, $L^1$, $L^2$, EG, a, b, and c are as described herein. The quantity b+c is independently 2 to 30, or about 2, 3, 4, 5, 6, 7, 8, 9, 10, 12, 14, 16, 18, 20, 25, or 30.

In various embodiments, the constitutionally dynamic polymer can have the structure:

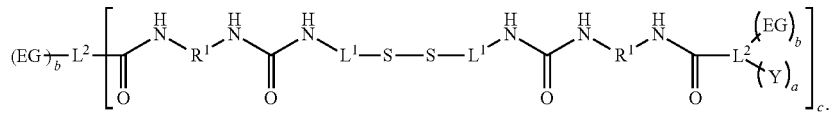

The variable —$Y^1$ can have the structure:

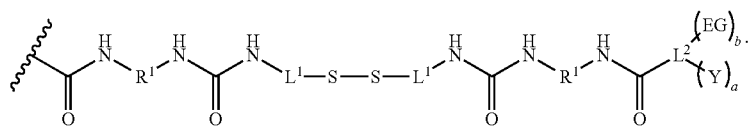

The variable —$Y^2$ can have the structure:

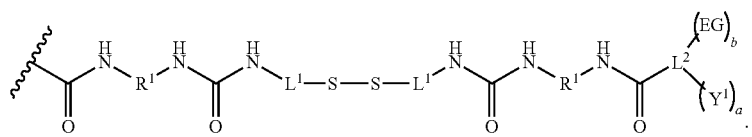

The variables $R^1$, $L^1$, $L^2$, EG, a, b, and c are as described herein. The quantity b+c is independently 2 to 30, or about 2, 3, 4, 5, 6, 7, 8, 9, 10, 12, 14, 16, 18, 20, 25, or 30. The quantity a+c is independently 1 to 30, or about 1, 2, 3, 4, 5, 6, 7, 8, 9, 10, 12, 14, 16, 18, 20, 25, or 30

In some embodiments, the constitutionally dynamic polymer can include one or more suitable protecting groups adjacent to the disulfide linkages that prevent or slow the self-healing behavior of the polymer, wherein the protecting groups can be deprotected to activate the polymer for self-healing by exposure to conditions downhole for a sufficient time, such as temperature and pressure conditions downhole.

Other Components.

The composition including the constitutionally dynamic polymer, or a mixture including the composition, can include any suitable additional component in any suitable proportion, such that the constitutionally dynamic polymer, composition, or mixture including the same, can be used as described herein.

In various embodiments, the composition includes a protective coating on the constitutionally dynamic polymer that can help to prevent particles of the polymer from agglomerating into a single mass of polymer, or that can slow the self-healing behavior. The protective coating can be any suitable material, such as a mineral coating, such as talc. Exposure to conditions downhole for a sufficient time, such as temperature and pressure, can be sufficient to activate the polymer by removing the protective coating or by making the polymer malleable enough to expose the uncoated inner surfaces of polymer particles.

In some embodiments, the composition includes one or more viscosifiers. The viscosifier can be any suitable viscosifier. The viscosifier can affect the viscosity of the composition or a solvent that contacts the composition at any suitable time and location. In some embodiments, the viscosifier provides an increased viscosity at least one of before injection into the subterranean formation, at the time of injection into the subterranean formation, during travel through a tubular disposed in a borehole, once the composition reaches a particular subterranean location, or some period of time after the composition reaches a particular subterranean location. In some embodiments, the viscosifier can be about 0.000.1 wt % to about 10 wt % of the composition or a mixture including the same, about 0.004 wt % to about 0.01 wt %, or about 0.000.1 wt % or less, 0.000.5 wt %, 0.001, 0.005, 0.01, 0.05, 0.1, 0.5, 1, 2, 3, 4, 5, 6, 7, 8, 9, or about 10 wt % or more of the composition or a mixture including the same.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and a poly($(C_2-C_{10})$alkene), wherein the $(C_2-C_{10})$alkene is substituted or unsubstituted. The viscosifier can include at least one of poly(acrylic acid) or $(C_1-C_5)$alkyl esters thereof, poly(methacrylic acid) or $(C_1-C_5)$alkyl esters thereof, poly(vinyl acetate), poly(vinyl alcohol), poly(ethylene glycol), poly(vinyl pyrrolidone), polyacrylamide, poly(hydroxyethyl methacrylate), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum (e.g., hydroxypropyl guar, carboxy methyl guar, or carboxymethyl hydroxypropyl guar), gum ghatti, gum arabic, locust bean gum, cellulose, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted $(C_2-C_{50})$hydrocarbyl having at least one aliphatic unsaturated C—C bond therein, and a substituted or unsubstituted $(C_2-C_{50})$alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted $(C_1-C_{20})$alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted $(C_1-C_{20})$alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted $(C_1-C_{20})$alkenoic substituted or unsubstituted $(C_1-C_{20})$alkanoic anhydride, a substituted or unsubstituted $(C_1-C_{20})$alkenoic substituted or unsubstituted $(C_1-C_{20})$alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—$(C_1-C_{10})$alkenyl nitrogen containing substituted or unsubstituted $(C_1-C_{10})$heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly (vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the composition can include one or more crosslinkers. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a ($C_1$-$C_{30}$)hydrocarbylboronic acid, a ($C_1$-$C_{30}$)hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a ($C_1$-$C_{20}$)alkylenebiacrylamide (e.g., methylenebisacrylamide), a poly(($C_1$-$C_{20}$)alkenyl)-substituted mono- or poly-($C_1$-$C_{20}$)alkyl ether (e.g., pentaerythritol allyl ether), and a poly($C_2$-$C_{20}$)alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000.01 wt % to about 5 wt % of the composition or a mixture including the same, about 0.001 wt % to about 0.01 wt %, or about 0.000.01 wt % or less, or about 0.000.05 wt %, 0.000,1, 0.000,5, 0.001, 0.005, 0.01, 0.05, 0.1, 0.5, 1, 2, 3, 4, or about 5 wt % or more.

In some embodiments, the composition can include one or more breakers. The breaker can be any suitable breaker, such that the surrounding fluid can be at least partially broken for more complete and more efficient recovery thereof. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH_4^+$, $Fe^{2+}$, $Fe^{3+}$, $Cu^{1+}$, $Cu^{2+}$, $Mg_{2+}$, $Zn^{2+}$, and an $Al^{3+}$ salt of a persulfate, percarbonate, perborate, peroxide, perphosphosphate, permanganate, chlorite, or hypochlorite ion. An enzymatic breaker can be at least one of an alpha or beta amylase, amyloglucosidase, oligoglucosidase, invertase, maltase, cellulase, hemi-cellulase, and mannanohydrolase. The breaker can be about 0.001 wt % to about 30 wt % of the composition or a mixture including the same, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The composition, or a mixture including the composition, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The composition including the constitutionally dynamic polymer or a mixture including the same can include any suitable downhole fluid, e.g., a drilling fluid, diverting fluid, spotting fluid, pill, cementing fluid, packer fluid, logging fluid, or a combination thereof. The composition including the constitutionally dynamic polymer can be combined with any suitable downhole fluid before, during, or after the placement of the composition in the subterranean formation or the contacting of the composition and the subterranean material. In some examples, the composition including the constitutionally dynamic polymer is combined with a downhole fluid above the surface, and then the combined composition is placed in a subterranean formation or contacted with a subterranean material. In another example, the composition including the constitutionally dynamic polymer is injected into a subterranean formation to combine with a downhole fluid, and the combined composition is contacted with a subterranean material or is considered to be placed in the subterranean formation. The placement of the composition in the subterranean formation can include contacting the subterranean material and the mixture. Any suitable weight percent of the composition or of a mixture including the same that is placed in the subterranean formation or contacted with the subterranean material can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture including the same.

In some embodiments, the composition, or a mixture including the same, can include any suitable amount of any suitable material used in a downhole fluid. For example, the composition or a mixture including the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof. In various embodiments, the composition or a mixture including the same can include one or more additive components such as: COLD-TROL®, ATC®, OMC 2™, and OMC 42™ thinner additives; RHEMOD™ viscosifier and suspension agent; TEM-PERUS™ and VIS-PLUS® additives for providing temporary increased viscosity; TAU-MOD™ viscosifying/suspension agent; ADAPTA®, DURATONE® HT, THERMO TONE™, BDF™-366, and BDF™-454 filtration control agents; LIQUITONE™ polymeric filtration agent and viscosifier; FACTANT™ emulsion stabilizer; LE SUPERMUL™, EZ MUL® NT, and FORTI-MUL® emulsifiers; DRIL TREAT® oil wetting agent for heavy fluids; AQUATONE-S™ wetting agent; BARACARB® bridging agent; BAROID® weighting agent; BAROLIFT® hole sweeping agent; SWEEP-WATE® sweep weighting agent; BDF-508 rheology modifier; and GELTONE® II organophilic clay. In various embodiments, the composition or a mixture including the same can include one or more additive components such as: X-TEND® II, PAC™-R, PAC™-L, LIQUI-VIS® EP, BRINEDRIL-VIS™, BARAZAN®, N-VIS®, and AQUAGEL® viscosifiers; THERMA-CHEK®, N-DRIL™, N-DRIL™ HT PLUS, IMPERMEX®, FILTERCHEK™, DEXTRID®, CARBONOX®, and BARANEX® filtration control agents; PERFORMATROL®, GEM™, EZ-MUD®, CLAY GRABBER®, CLAYSEAL®, CRYSTAL-DRIL®, and CLAY SYNC™ II shale stabilizers; NXS-LUBE™, EP MUDLUBE®, and DRIL-N-SLIDE™ lubricants; QUIK-THIN®, IRON-THIN™, THERMA-THIN®, and ENVIRO-THIN™ thinners; SOURSCAV™ scavenger; BARACOR® corrosion inhibitor; and WALL-NUT®, SWEEP-WATE®, STOP-PIT™, PLUG-GIT®, BARACARB®, DUO-SQUEEZE®, BAROFIBRE™, STEELSEAL®, and HYDRO-PLUG® lost circulation management materials. Any suitable proportion of the composition or mixture including the composition can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill bit as well as reduce friction between the drill string and the sides of the hole. The drilling fluid aids in support of the drill pipe and drill bit, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and also to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase. A drilling fluid can be present in the composition or a mixture including the same in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, or about 99.999 wt % or more.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g., barium sulfate), surfactants (e.g., betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g., silica), pigments, dyes, precipitating agents (e.g., silicates or aluminum complexes), and rheology modifiers such as thickeners or viscosifiers (e.g., xanthan gum). Any ingredient listed in this paragraph can be either present or not present in the mixture.

An oil-based drilling fluid or mud in embodiments of the present invention can be any suitable oil-based drilling fluid. In various embodiments the drilling fluid can include at least one of an oil-based fluid (or synthetic fluid), saline, aqueous solution, emulsifiers, other agents or additives for suspension control, weight or density control, oil-wetting agents, fluid loss or filtration control agents, and rheology control agents. An oil-based or invert emulsion-based drilling fluid can include between about 10:90 to about 95:5, or about 50:50 to about 95:5, by volume of oil phase to water phase. A substantially all oil mud includes about 100% liquid phase oil by volume (e.g., substantially no internal aqueous phase).

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

A cement fluid can include an aqueous mixture of at least one of cement and cement kiln dust. The composition including the constitutionally dynamic polymer can form a useful combination with cement or cement kiln dust. The cement kiln dust can be any suitable cement kiln dust. Cement kiln dust can be forming during the manufacture of cement and can be partially calcined kiln feed that is removed from the gas stream and collected in a dust collector during a manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with embodiments of the present invention; for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in embodiments of the present invention are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, about 0 wt % to about 95 wt %, about 20 wt % to about 95 wt %, or about 50 wt % to about 90 wt %. A cement kiln dust can be present in an amount of at least about 0.01 wt %, or about 5 wt % to about 80 wt %, or about 10 wt % to about 50 wt %.

Optionally, other additives can be added to a cement or kiln dust-containing composition of embodiments of the present invention as deemed appropriate by one skilled in the art, with the benefit of this disclosure. Any optional ingredient listed in this paragraph can be either present or not present in the composition. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

In various embodiments, the composition or mixture can include a proppant, a resin-coated proppant, an encapsulated resin, or a combination thereof. A proppant is a material that keeps an induced hydraulic fracture at least partially open during or after a fracturing treatment. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ polytetrafluoroethylene), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The composition or mixture can include any suitable amount of proppant, such as about 0.01 wt % to about 99.99 wt %, about 0.1 wt % to about 80 wt %, about 10 wt % to about 60 wt %, or about 0.01 wt % or less, or about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more.

Drilling Assembly.

Figure 2:
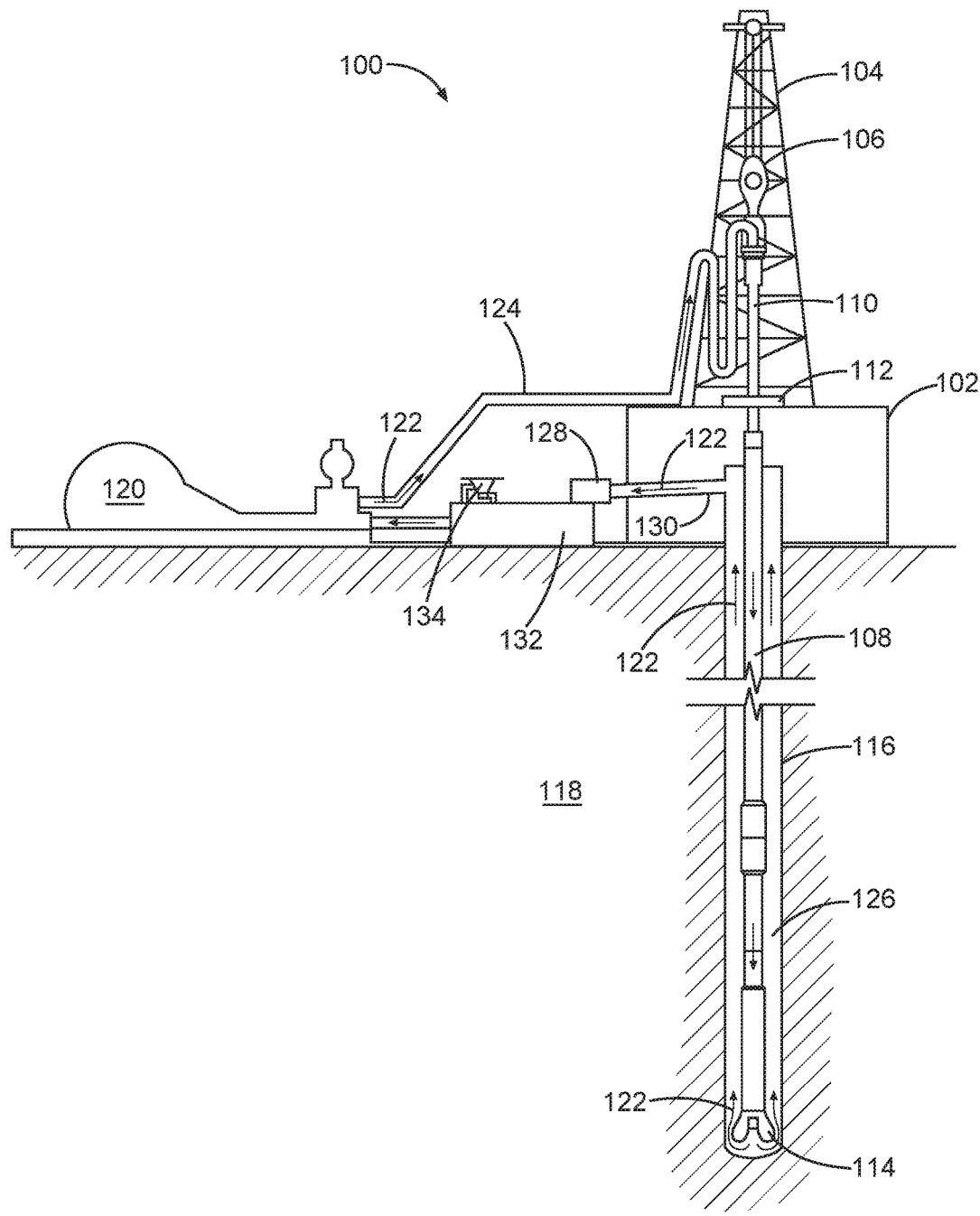
FIG. 2 illustrates a drilling assembly, in accordance with various embodiments.

In various embodiments, the composition including the constitutionally dynamic polymer disclosed herein can directly or indirectly affect one or more components or pieces of equipment associated with the preparation, delivery, recapture, recycling, reuse, and/or disposal of the disclosed composition including the constitutionally dynamic polymer. For example, and with reference to FIG. 2, the disclosed composition including the constitutionally dynamic polymer can directly or indirectly affect one or more components or pieces of equipment associated with an exemplary wellbore drilling assembly 100, according to one or more embodiments. It should be noted that while FIG. 2 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 can include a drilling platform 102 that supports a derrick 104 having a traveling block 106 for raising and lowering a drill string

108. The drill string 108 can include drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While the fluid processing unit(s) 128 is illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the disclosure.

The composition including the constitutionally dynamic polymer can be added to the drilling fluid 122 via a mixing hopper 134 communicably coupled to or otherwise in fluid communication with the retention pit 132. The mixing hopper 134 can include mixers and related mixing equipment known to those skilled in the art. In other embodiments, however, the composition including the constitutionally dynamic polymer can be added to the drilling fluid 122 at any other location in the drilling assembly 100. In at least one embodiment, for example, there could be more than one retention pit 132, such as multiple retention pits 132 in series. Moreover, the retention pit 132 can be representative of one or more fluid storage facilities and/or units where the composition including the constitutionally dynamic polymer can be stored, reconditioned, and/or regulated until added to the drilling fluid 122.

As mentioned above, the composition including the constitutionally dynamic polymer can directly or indirectly affect the components and equipment of the drilling assembly 100. For example, the composition including the constitutionally dynamic polymer can directly or indirectly affect the fluid processing unit(s) 128, which can include one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition the composition including the constitutionally dynamic polymer.

The composition including the constitutionally dynamic polymer can directly or indirectly affect the pump 120, which representatively includes any conduits, pipelines, trucks, tubulars, and/or pipes used to fluidically convey the composition including the constitutionally dynamic polymer to the subterranean formation; any pumps, compressors, or motors (e.g., topside or downhole) used to drive the composition into motion; any valves or related joints used to regulate the pressure or flow rate of the composition; and any sensors (e.g., pressure, temperature, flow rate, and the like), gauges, and/or combinations thereof, and the like. The composition including the constitutionally dynamic polymer can also directly or indirectly affect the mixing hopper 134 and the retention pit 132 and their assorted variations.

The composition including the constitutionally dynamic polymer can also directly or indirectly affect the various downhole or subterranean equipment and tools that can come into contact with the composition including the constitutionally dynamic polymer such as the drill string 108, any floats, drill collars, mud motors, downhole motors, and/or pumps associated with the drill string 108, and any measurement while drilling (MWD)/logging while drilling (LWD) tools and related telemetry equipment, sensors, or distributed sensors associated with the drill string 108. The composition including the constitutionally dynamic polymer can also directly or indirectly affect any downhole heat exchangers, valves and corresponding actuation devices, tool seals, packers and other wellbore isolation devices or components, and the like associated with the wellbore 116. The composition including the constitutionally dynamic polymer can also directly or indirectly affect the drill bit 114, which can include roller cone bits, polycrystalline diamond compact (PDC) bits, natural diamond bits, hole openers, reamers, coring bits, and the like.

While not specifically illustrated herein, the composition including the constitutionally dynamic polymer can also directly or indirectly affect any transport or delivery equipment used to convey the composition including the constitutionally dynamic polymer to the drilling assembly 100 such as, for example, any transport vessels, conduits, pipelines, trucks, tubulars, and/or pipes used to fluidically move the composition including the constitutionally dynamic polymer from one location to another, any pumps, compressors, or motors used to drive the composition into motion, any valves or related joints used to regulate the pressure or flow rate of the composition, and any sensors (e.g., pressure and temperature), gauges, and/or combinations thereof, and the like.

System or Apparatus.

In various embodiments, the present invention provides a system. The system can be any suitable system that can use or that can be generated by use of an embodiment of the composition described herein in a subterranean formation, or that can perform or be generated by performance of a method for using the composition described herein. The system can include a composition including a constitutionally dynamic polymer, such as any constitutionally dynamic polymer described herein. The system can also include a subterranean formation including the composition therein. In some embodiments, the composition in the system can also include a downhole fluid, or the system can include a mixture of the composition and downhole fluid. In some embodiments, the system can include a tubular, and a pump configured to pump the composition into the subterranean formation through the tubular.

Various embodiments provide systems and apparatus configured for delivering the composition described herein to a subterranean location and for using the composition therein, such as for a drilling operation. In various embodiments, the system or apparatus can include a pump fluidly coupled to a tubular (e.g., any suitable type of oilfield pipe, such as pipeline, drill pipe, production tubing, and the like), with the tubular containing a composition including the constitutionally dynamic polymer described herein.

In some embodiments, the system can include a drill string disposed in a wellbore, with the drill string including a drill bit at a downhole end of the drill string. The system can also include an annulus between the drill string and the wellbore. The system can also include a pump configured to circulate the composition through the drill string, through the drill bit, and back above-surface through the annulus. In some embodiments, the system can include a fluid processing unit configured to process the composition exiting the annulus to generate a cleaned drilling fluid for recirculation through the wellbore.

The pump can be a high pressure pump in some embodiments. As used herein, the term "high pressure pump" will refer to a pump that is capable of delivering a fluid to a subterranean formation (e.g., downhole) at a pressure of about 1000 psi or greater. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery to the subterranean formation.

Figure 3:
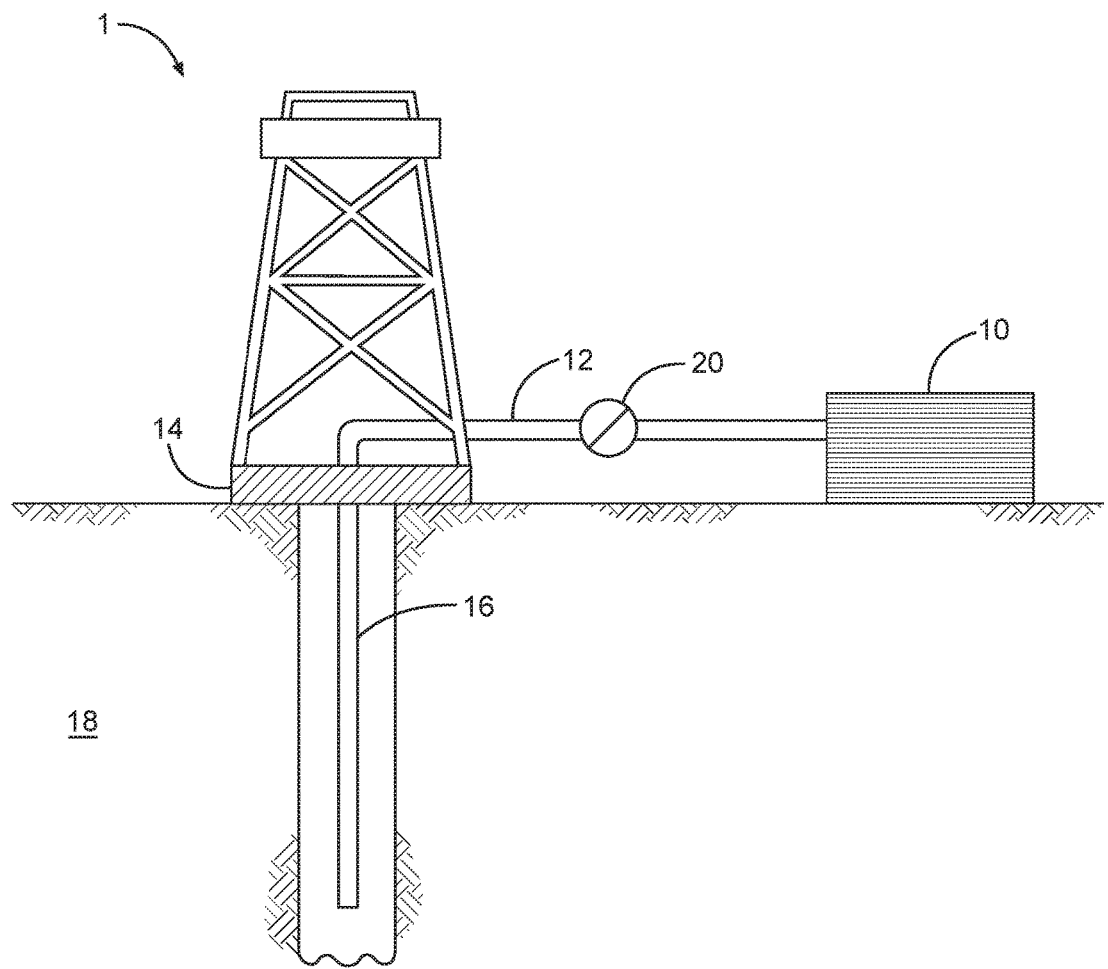
FIG. 3 illustrates a system or apparatus for delivering a composition to a subterranean formation, in accordance with various embodiments.

FIG. 3 shows an illustrative schematic of systems and apparatuses that can deliver embodiments of the compositions of the present invention to a subterranean location, according to one or more embodiments. It should be noted that while FIG. 3 generally depicts a land-based system or apparatus, it is to be recognized that like systems and apparatuses can be operated in subsea locations as well. Embodiments of the present invention can have a different scale than that depicted in FIG. 3. As depicted in FIG. 3, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 3 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 3, at least part of the composition can, in some embodiments, flow back to wellhead 14 and exit subterranean formation 18. The composition that flows back can be substantially diminished in the concentration of the constitutionally dynamic polymer therein. In some embodiments, the composition that has flowed back to wellhead 14 can subsequently be recovered, and in some examples reformulated, and recirculated to subterranean formation 18.

It is also to be recognized that the disclosed composition can also directly or indirectly affect the various downhole or subterranean equipment and tools that can come into contact with the composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 3.

Composition for Treatment of a Subterranean Formation.

Various embodiments provide a composition for treatment of a subterranean formation. The composition can be any suitable composition that can be used to perform an embodiment of the method for treatment of a subterranean formation described herein. For example, the composition can include a constitutionally dynamic polymer, such as any constitutionally dynamic polymer described herein.

In some embodiments, the composition further includes a downhole fluid, or is a downhole fluid. The downhole fluid can be any suitable downhole fluid. In some embodiments, the downhole fluid is at least one of a drilling fluid, diverting fluid, spotting fluid, pill, cementing fluid, packer fluid, and a logging fluid.

In some embodiments, the composition can be a drilling fluid composition that includes a constitutionally dynamic polymer including at least one disulfide linkage. The constitutionally dynamic polymer can be at least one of a lost-circulation material and a fluid loss control additive. About 0.01 wt % to about 50 wt % of the drilling fluid can be the constitutionally dynamic polymer. The constitutionally dynamic polymer can have the following structure:

$$M{-}(Y)_a.$$

At each occurrence M can independently have the structure:

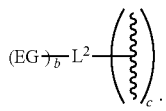

At each occurrence —Y can independently have the structure:

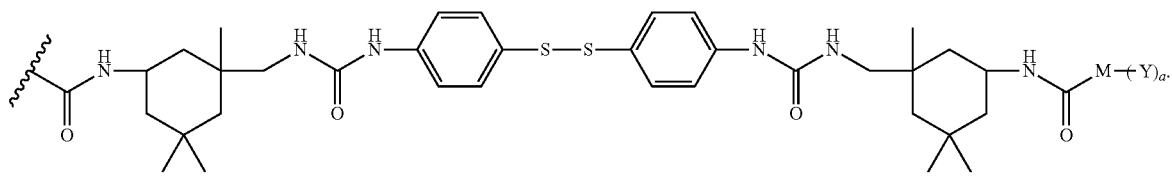

At each occurrence $L^2$ can independently have the structure:

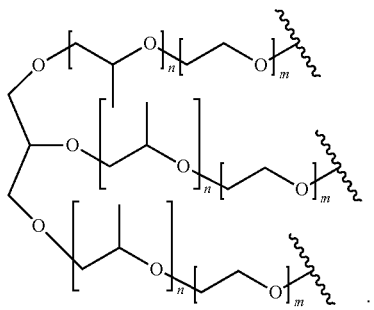

At each occurrence n can be independently 0 to 500. At each occurrence m can be independently 0 to 500. Each $L^2$ can include at least one of the propoxy groups having degree of polymerization n and at least one of the ethoxy groups having degree of polymerization m. At each occurrence $L^2$ can independently have a molecular weight of about 250 to about 100,000.

At each occurrence EG can be independently chosen from —H and a substituted or unsubstituted $(C_1-C_{20})$hydrocarbyl interrupted by 0, 1, 2, or 3 groups independently chosen from —O—, —S—, and substituted or unsubstituted —NH—. At each occurrence the variable a can be independently 0 to 3. At each occurrence of M, b+c can be 3. The constitutionally dynamic polymer can have at least two disulfide groups.

Method for Preparing a Composition for Treatment of a Subterranean Formation.

In various embodiments, the present invention provides a method for preparing a composition for treatment of a subterranean formation. The method can be any suitable method that produces a composition described herein. For example, the method can include forming a composition including a constitutionally dynamic polymer, such as any constitutionally dynamic polymer described herein.

In some embodiments, the method includes combining polyol $(EG)_b$-$L^2$-$(OH)_c$ with diisocyanate OCN—$R^1$—NCO to form polymer precursor $(EG)_b$-$L^2$-$(OC(O)NH—R^1—NCO)_c$. The method can also include combining the polymer precursor with diamine $H_2N$-$L^1$-S—S-$L^1$-$N_2H$ to form the constitutionally dynamic polymer.

EXAMPLES

Various embodiments of the present invention can be better understood by reference to the following Examples which are offered by way of illustration. The present invention is not limited to the Examples given herein.

Example 1. Synthesis of Prepolymer

In this Example, a polyol was reacted with diisophorone diisocyanate to give a polyurethane prepolymer.

Figure 4:
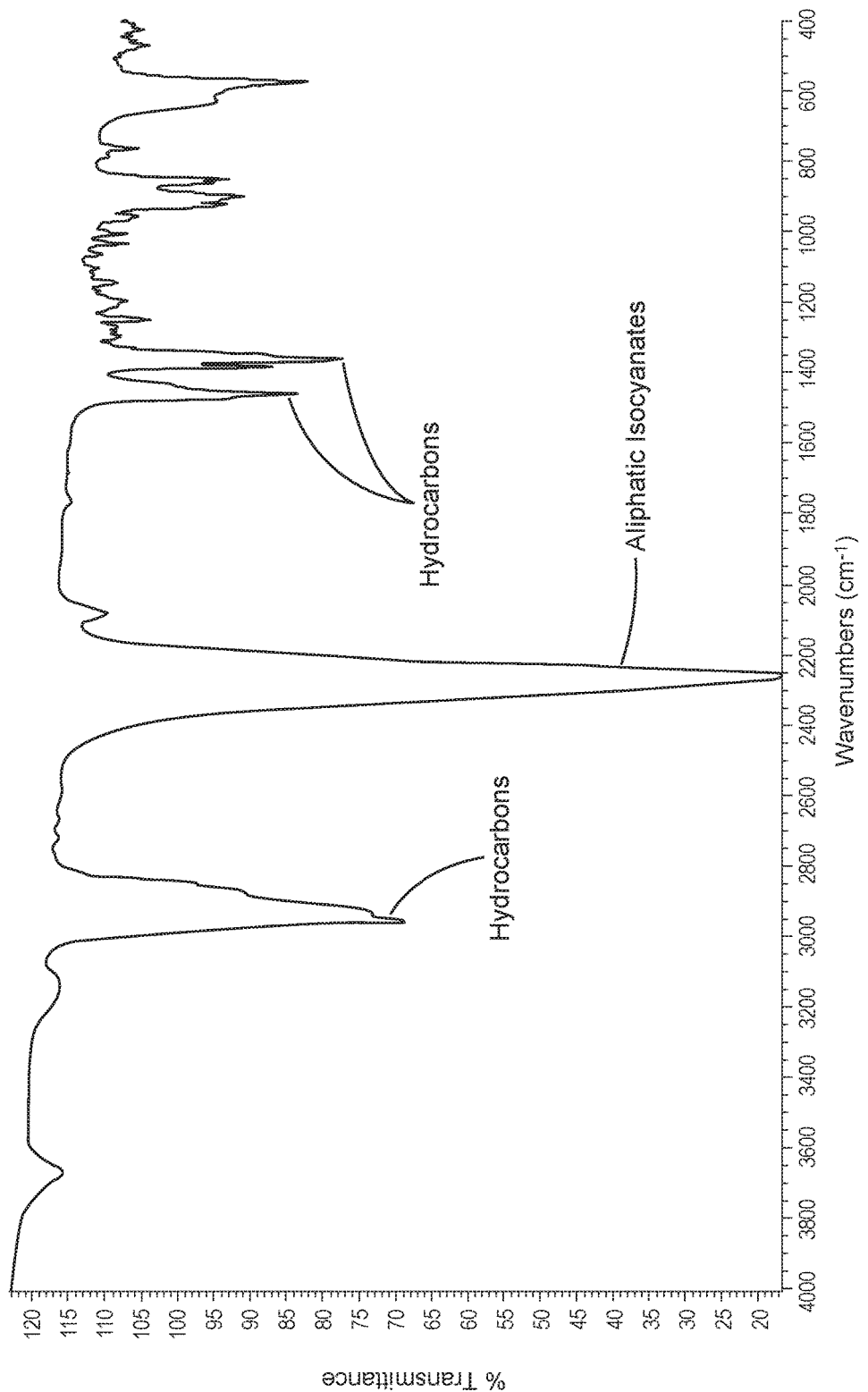
FIG. 4 illustrates a Fourier transform infrared (FTIR) spectrum of isophorone diisocyanate, in accordance with various embodiments.
Figure 5:
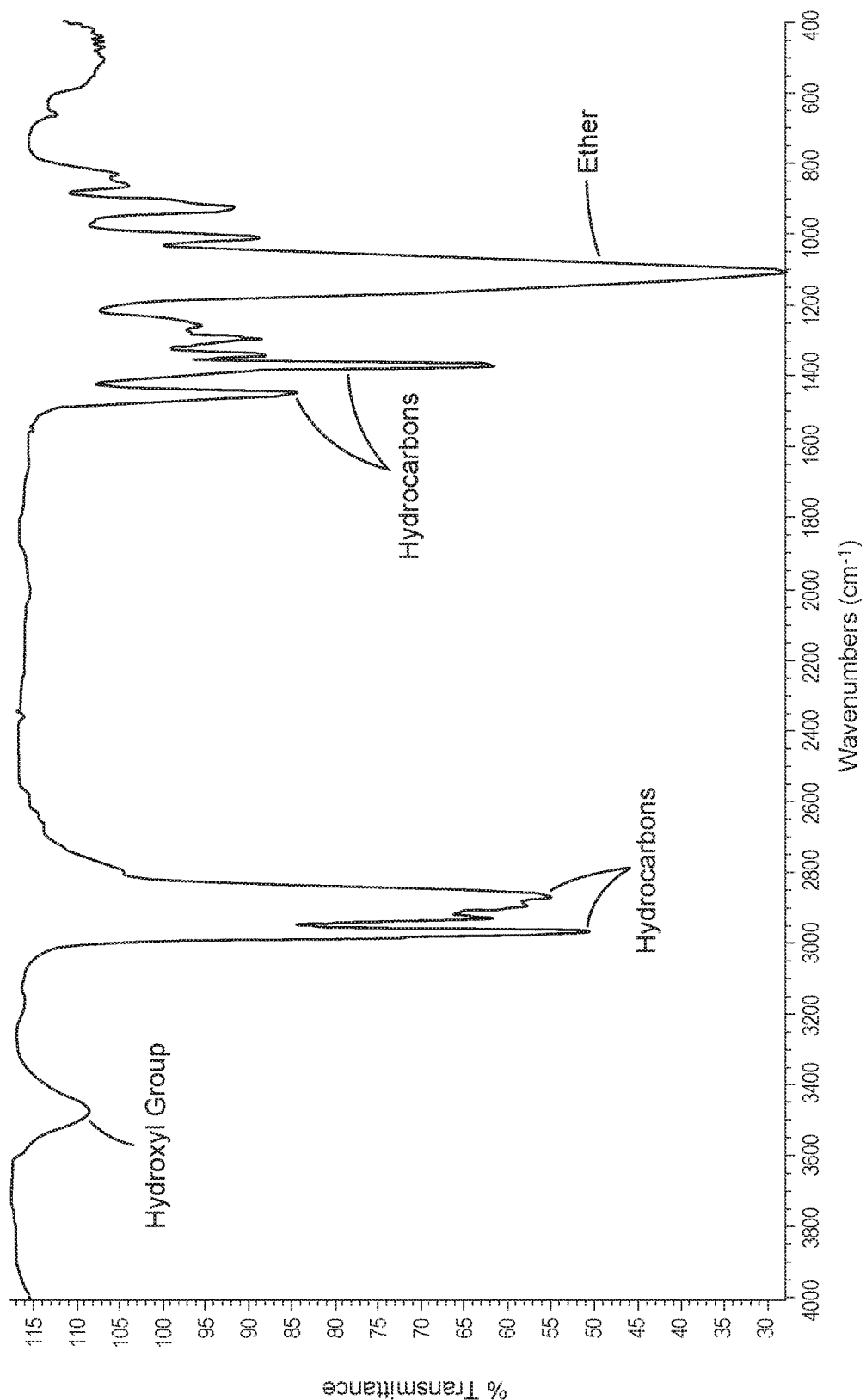
FIG. 5 illustrates an FTIR spectrum of glycerol propoxylate ethyoxylate, in accordance with various embodiments.
Figure 6:
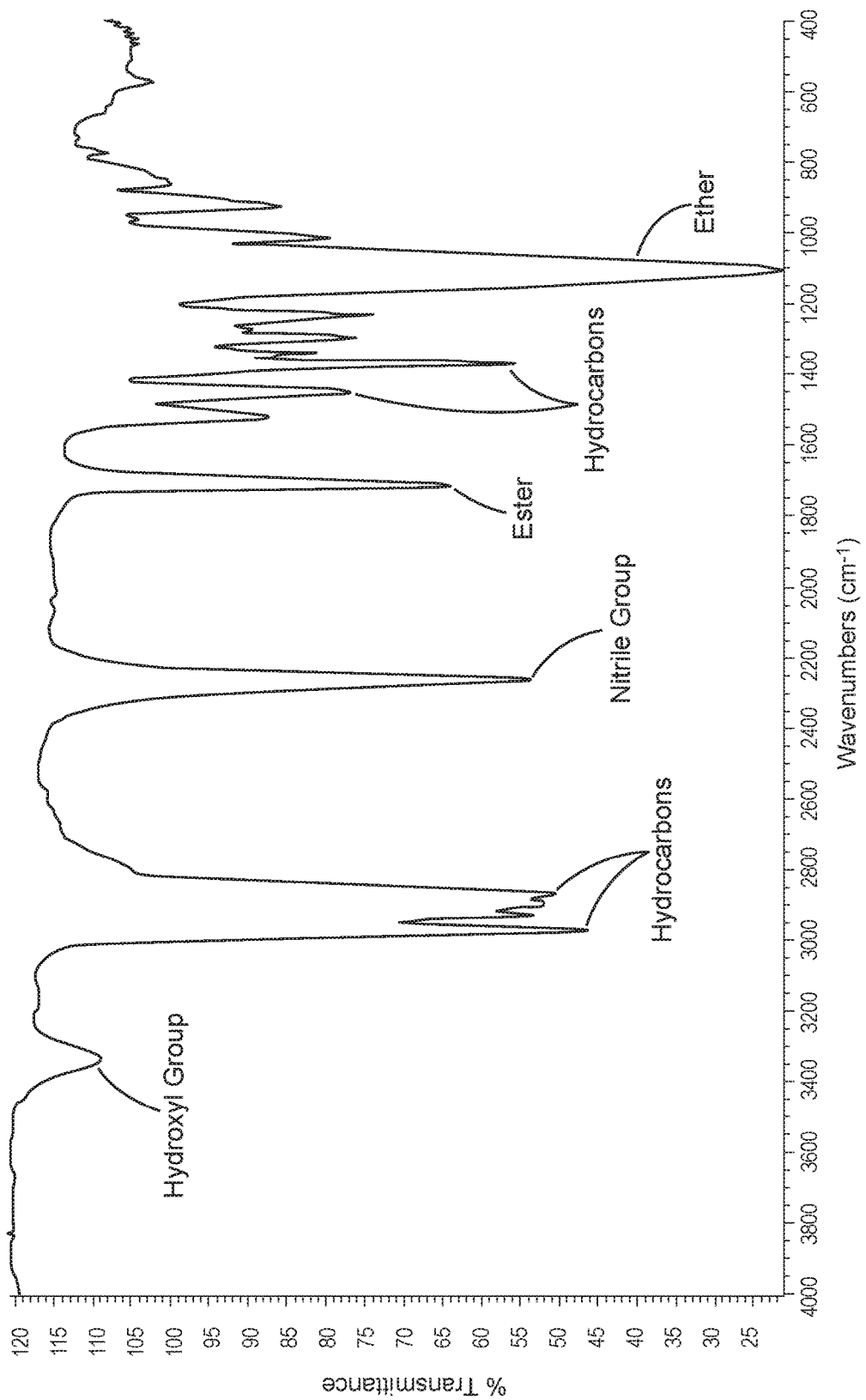
FIG. 6 illustrates an FTIR spectrum of a polyurethane prepolymer, in accordance with various embodiments.

Glycerol propoxylate ethyoxylate (390 grams, Multranol 3901 from Bayer, a triol having a molecular weight of 6,000) was mixed with isophorone diisocyanate (46 grams) and dibutyltin dilaurate (0.2 grams) under vacuum in a 1-liter reactor flask equipped with a mechanical stirrer. The mixture was heated to 170° F. and stirred for 2 hours. The resulting prepolymer was placed in a glass jar and sealed. FIG. 4 illustrates the Fourier transform infrared (FTIR) spectrum of the isophorone diisocyanate starting material. FIG. 5 illustrates the FTIR spectrum of the glycerol propoxylate ethyoxylate starting material. FIG. 6 illustrates the FTIR spectrum of the formed polyurethane prepolymer.

Example 2. Synthesis of Constitutionally Dynamic Polymer

In this Example, 4,4'-diaminodiphenyl disulphide was condensed with the remaining isocyanate groups on the prepolymer of Example 1 to give the constitutionally dynamic viscoelastic disulfide polyurethane polymer.

Figure 7:
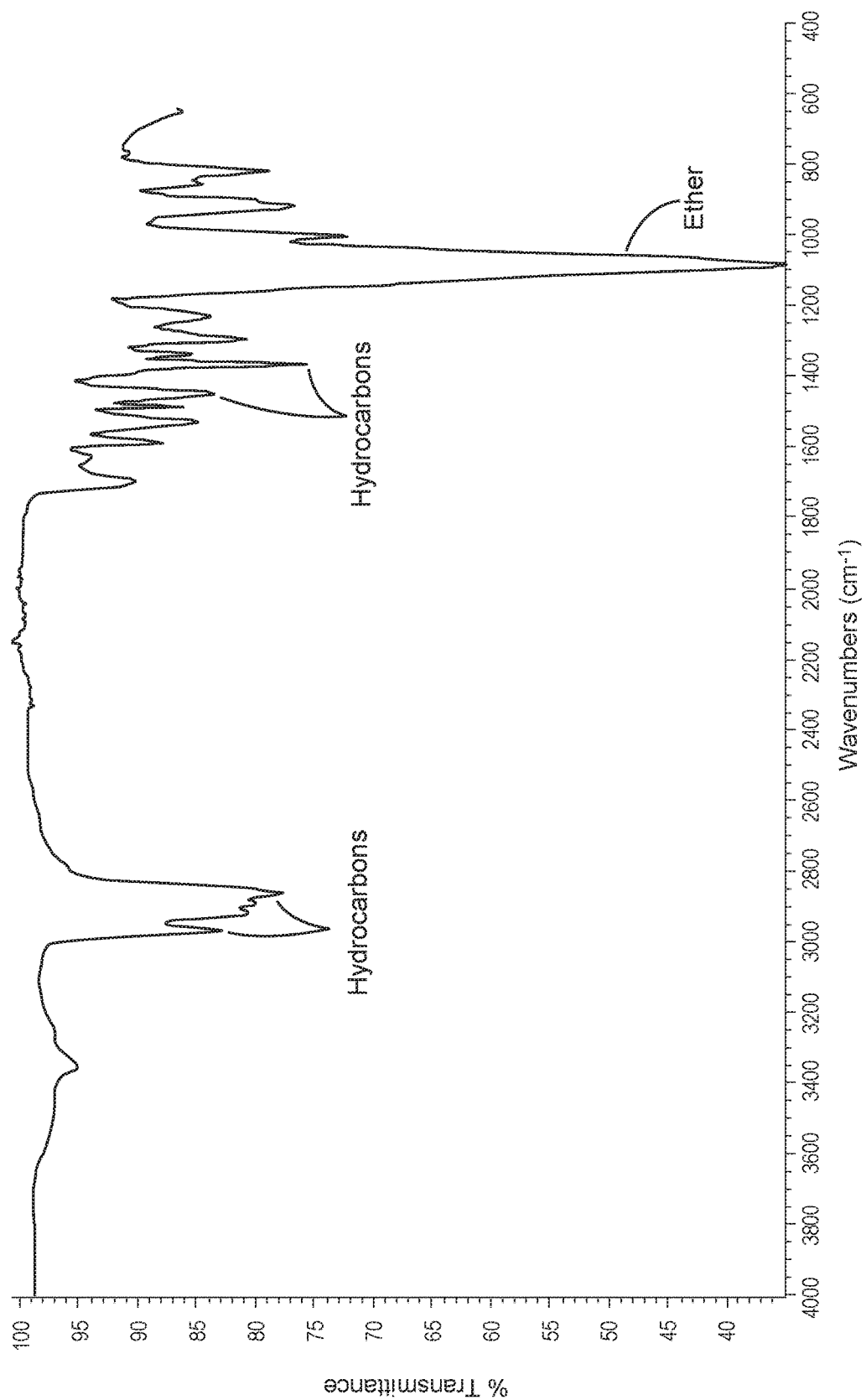
FIG. 7 illustrates an FTIR spectrum of a constitutionally dynamic polymer, in accordance with various embodiments.

The prepolymer of Example 1 (50 grams) was mixed with 4,4'-diaminodiphenyl disulphide (5.1 grams) dissolved in tetrahydrofuran (5 mL). The mixture was stirred under vacuum at room temperature in a 500 mL reactor flask equipped with a mechanical stirrer for 30 minutes. The mixture was then poured into a 1"×2" mold and cured at 140° F. over 24 hours in a water bath. The sample was removed from the mold. FIG. 7 illustrates the FTIR spectrum of the constitutionally dynamic polymer, which shows no isocyanate functionality.

The sample was cut in half and placed back together. The sample was observed to "heal" at the interface of the two halves to render a unified mass. The halves appeared to be covalently joined, rather than merely stuck together.

Example 3. Determination of $T_g$ of the Constitutionally Dynamic Polymer

Figure 8:
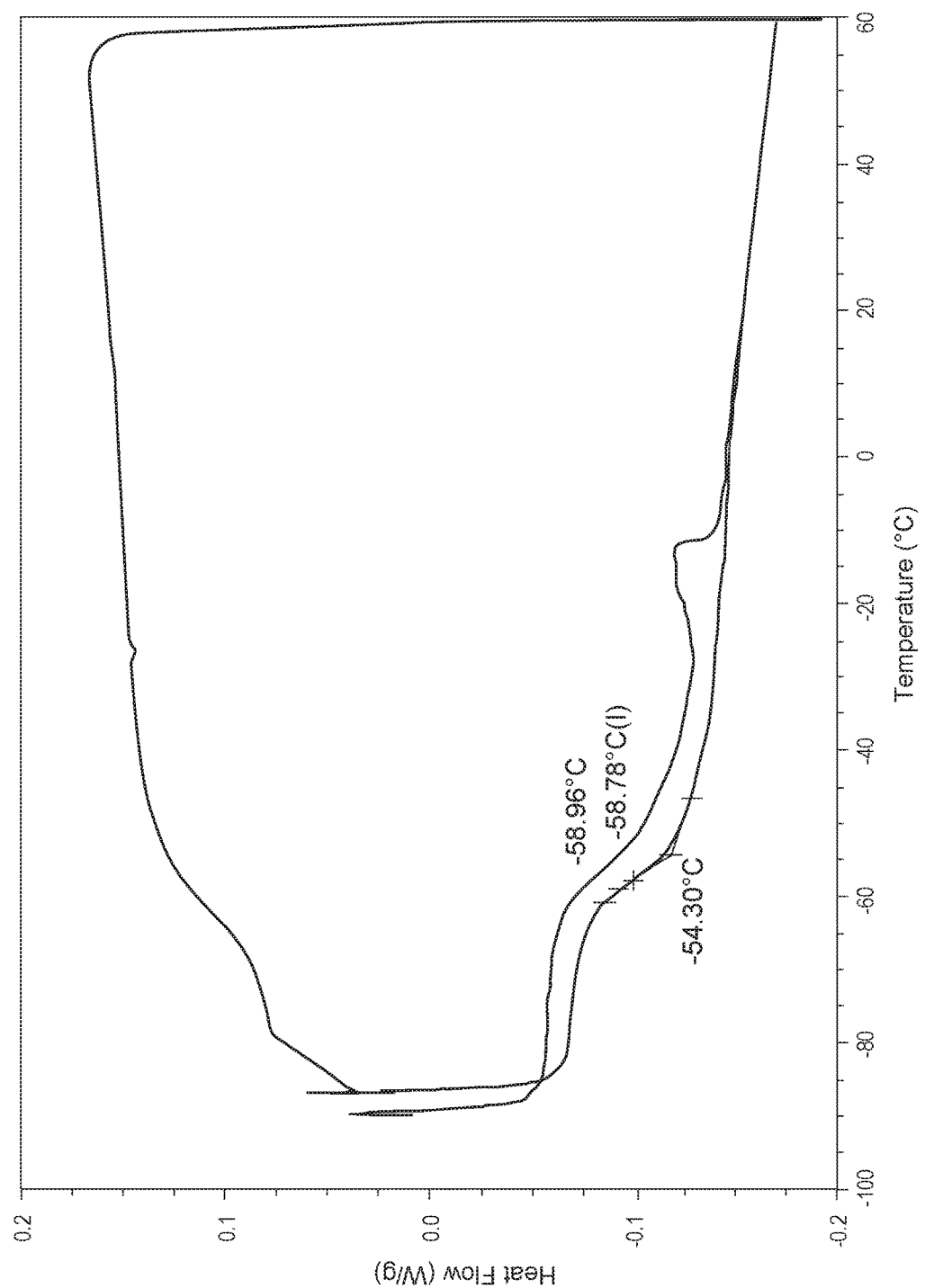
FIG. 8 illustrates a differential scanning calorimetry plot for a constitutionally dynamic polymer, in accordance with various embodiments.

Differential scanning calorimetry (DSC) was used to determine the glass transition temperature ($T_g$) of the polymer formed in Example 2. FIG. 8 illustrates the DSC plot for the polymer. The $T_g$ of the polymer was measured as −54.30° C.

Example 4. Fluid Loss Testing

To evaluate the ability of the material to heal and provide advantages for downhole applications a simple fluid loss test was performed using the constitutionally dynamic polymer formed in Example 2. The polymer was cut into 30-40 roughly spherical pastilles of about 0.5 cm in diameter. These pieces where then placed in a standard Fann 175 mL high temperature high pressure fluid loss cell along with filter paper. Water was then added until the cell was nearly filled. The fluid loss behavior was observed at ambient temperature and 100 psi differential pressure. Under these conditions, rapid and complete defluidization was observed. The test was set up again under identical conditions, but this time was performed at 160° F. with a 300 psi differential pressure. Under these conditions only a small volume of filtrate was observed, indicating that tight seal of low permeability was formed, due to the self-healing of the polymer pieces into a larger consolidated mass.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of treating a subterranean formation, the method comprising:
placing in the subterranean formation a composition comprising a constitutionally dynamic polymer. In some embodiments, the constitutionally dynamic polymer can include at least one disulfide group. In some embodiments, the constitutionally dynamic polymer is free of disulfide groups.

Embodiment 2 provides the method of Embodiment 1, wherein the method further comprises obtaining or providing the composition, wherein the obtaining or providing of the composition occurs above-surface.

Embodiment 3 provides the method of any one of Embodiments 1-2, wherein the method further comprises obtaining or providing the composition, wherein the obtaining or providing of the composition occurs in the subterranean formation.

Embodiment 4 provides the method of any one of Embodiments 1-3, wherein the constitutionally dynamic polymer is at least one of a lost-circulation material and a fluid loss control additive.

Embodiment 5 provides the method of any one of Embodiments 1-4, further comprising drilling in the subterranean formation using the composition comprising the constitutionally dynamic polymer as a drilling.

Embodiment 6 provides the method of any one of Embodiments 1-5, further comprising activating the constitutionally dynamic polymer for self-healing.

Embodiment 7 provides the method of any one of Embodiments 1-6, wherein about 0.01 wt % to about 100 wt % of the composition is the constitutionally dynamic polymer.

Embodiment 8 provides the method of any one of Embodiments 1-7, wherein the composition comprises a carrier fluid.

Embodiment 9 provides the method of any one of Embodiments 1-8, further comprising allowing the constitutionally dynamic polymer to self-heal in the subterranean formation.

Embodiment 10 provides the method of Embodiment 9, wherein allowing the constitutionally dynamic polymer to self-heal comprises placing the constitutionally dynamic polymer under a temperature and pressure sufficient to self-heal. In some embodiments, allowing the constitutionally dynamic polymer to self-heal comprises placing the constitutionally dynamic polymer under a temperature and pressure sufficient to undergo an intermolecular disulfide rearrangement.

Embodiment 11 provides the method of Embodiment 10, wherein the temperature sufficient for self-healing is about 100° F. to about 500° F.

Embodiment 12 provides the method of any one of Embodiments 10-11, wherein the temperature sufficient for self-healing is at least about 160° F.

Embodiment 13 provides the method of any one of Embodiments 10-12, wherein the pressure sufficient for self-healing is about 100 psi to about 50,000 psi.

Embodiment 14 provides the method of any one of Embodiments 10-13, wherein the pressure sufficient for self-healing is at least about 300 psi.

Embodiment 15 provides the method of any one of Embodiments 1-14, wherein the constitutionally dynamic polymer is a polyurethane.

Embodiment 16 provides the method of any one of Embodiments 1-15, wherein the constitutionally dynamic polymer has the following structure:

wherein at each occurrence M independently has the structure:

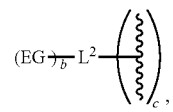

wherein at each occurrence —Y independently has the structure:

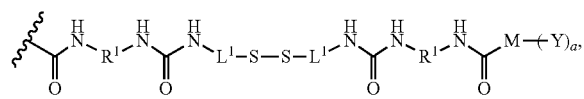

wherein
at each occurrence $R^1$ is a substituted or unsubstituted $(C_1\text{-}C_{30})$hydrocarbylene,
at each occurrence $L^1$ is independently chosen from a bond and a substituted or unsubstituted $(C_1\text{-}C_{30})$ hydrocarbylene at least one of interrupted and terminated by 0, 1, 2, or 3 groups independently chosen from —O— and substituted or unsubstituted —NH—,
at each occurrence $L^2$ is independently chosen from a substituted or unsubstituted $(C_1\text{-}C_{1,000})$hydrocarbyl group at least one of interrupted and terminated by 0 to 500 groups independently chosen from —O— and substituted or unsubstituted —NH—, wherein $L^2$ has a valency of b+c, at each occurrence EG is independently chosen from —H and a substituted or unsubstituted $(C_1-C_{30})$ hydrocarbyl interrupted by 0, 1, 2, or 3 groups independently chosen from —O— and substituted or unsubstituted —NH—, at each occurrence the variable a is independently 0 to 30, at each occurrence of M, b+c is independently 2 to 30, and the constitutionally dynamic polymer has at least two disulfide groups.

Embodiment 17 provides the method of Embodiment 16, wherein at each occurrence $R^1$ is independently a substituted or unsubstituted $(C_1-C_{30})$hydrocarbylene.

Embodiment 18 provides the method of any one of Embodiments 16-17, wherein at each occurrence $R^1$ is independently a substituted or unsubstituted $(C_1-C_{20})$alkylene.

Embodiment 19 provides the method of any one of Embodiments 16-18, wherein at each occurrence $R^1$ is independently a $(C_1-C_{20})$cycloalkylene.

Embodiment 20 provides the method of any one of Embodiments 16-19, wherein $R^1$ has the structure:

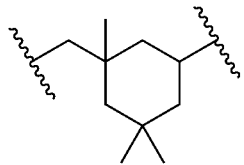

Embodiment 21 provides the method of any one of Embodiments 16-20, wherein at each occurrence $L^1$ is independently chosen from a bond and a substituted or unsubstituted $(C_1-C_{30})$hydrocarbylene.

Embodiment 22 provides the method of any one of Embodiments 16-21, wherein at each occurrence $L^1$ is independently chosen from a bond and a substituted or unsubstituted $(C_6-C_{30})$arylene.

Embodiment 23 provides the method of any one of Embodiments 16-22, wherein at each occurrence $L^1$ is phenylene.

Embodiment 24 provides the method of any one of Embodiments 16-23, wherein at each occurrence $L^1$ has the structure:

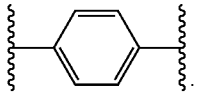

Embodiment 25 provides the method of any one of Embodiments 16-24, wherein at each occurrence $L^2$ is independently chosen from a $(C_1-C_{100})$hydrocarbyltriol group at least one of interrupted and terminated by 0 to 20 groups independently chosen from —O— and substituted or unsubstituted —NH—, wherein each alcohol group of the triol is independently ethoxylated with a degree of polymerization of 0 to 500.

Embodiment 26 provides the method of any one of Embodiments 16-25, wherein at each occurrence $L^2$ is independently a $(C_2-C_{10})$alkoxylated $(C_2-C_{10})$alkoxylated substituted or unsubstituted $(C_1-C_{20})$alkanepolyol.

Embodiment 27 provides the method of any one of Embodiments 16-26, wherein at each occurrence $L^2$ is independently an ethoxylated propoxylated glycerol.

Embodiment 28 provides the method of any one of Embodiments 16-27, wherein at each occurrence $L^2$ independently has the structure:

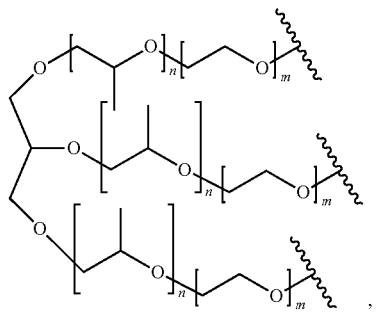

wherein
at each occurrence n is independently 0 to 500,
at each occurrence m is independently 0 to 500, and
each $L^2$ includes at least one of the propoxy groups having degree of polymerization n and at least one of the ethoxy groups having degree of polymerization m.

Embodiment 29 provides the method of any one of Embodiments 16-28, wherein at each occurrence $L^2$ independently has a molecular weight of about 250 to about 100,000.

Embodiment 30 provides the method of any one of Embodiments 16-29, wherein at each occurrence $L^2$ independently has a molecular weight of about 5,000 to about 7,000.

Embodiment 31 provides the method of any one of Embodiments 16-30, wherein at each occurrence EG is independently chosen from —H and a substituted or unsubstituted $(C_1-C_{20})$hydrocarbyl interrupted by 0, 1, 2, or 3 groups independently chosen from —O—, —S—, and substituted or unsubstituted —NH—.

Embodiment 32 provides the method of any one of Embodiments 16-31, wherein at each occurrence EG is independently chosen from —H and a $(C_1-C_{10})$hydrocarbyl.

Embodiment 33 provides the method of any one of Embodiments 16-32, wherein at each occurrence EG is independently chosen from —H and a $(C_1-C_5)$alkyl.

Embodiment 34 provides the method of any one of Embodiments 16-33, wherein at each occurrence the variable a is independently 0 to 5.

Embodiment 35 provides the method of any one of Embodiments 16-34, wherein at each occurrence the variable a is independently 0 to 3.

Embodiment 36 provides the method of any one of Embodiments 16-35, wherein at each occurrence of M, b+c is independently 2 to 5.

Embodiment 37 provides the method of any one of Embodiments 16-36, wherein at each occurrence of M, b+c is 3.

Embodiment 38 provides the method of any one of Embodiments 16-37, wherein the constitutionally dynamic polymer has about 2 to about 10,000,000 disulfide groups.

Embodiment 39 provides the method of any one of Embodiments 1-38, wherein the constitutionally dynamic polymer has the structure:

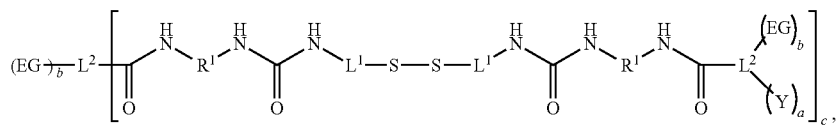

wherein —Y has the structure:

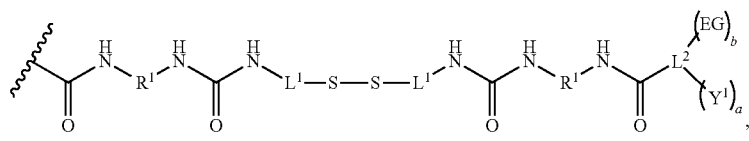

wherein
- at each occurrence $R^1$ is a substituted or unsubstituted $(C_1-C_{30})$hydrocarbylene,
- at each occurrence $L^1$ is independently chosen from a bond and a substituted or unsubstituted $(C_1-C_{30})$ hydrocarbylene at least one of interrupted and terminated by 0, 1, 2, or 3 groups independently chosen from —O— and substituted or unsubstituted —NH—,
- at each occurrence $L^2$ is independently chosen from a substituted or unsubstituted $(C_1-C_{1,000})$hydrocarbyl group at least one of interrupted and terminated by 0 to 500 groups independently chosen from —O— and substituted or unsubstituted —NH—, wherein $L^2$ has a valency of b+c,
- at each occurrence EG is independently chosen from —H and a $(C_1-C_{10})$hydrocarbyl,
- at each occurrence the variable a is independently 0 to 30,
- at each occurrence of M, b+c is independently 2 to 30, and
- the constitutionally dynamic polymer has at least two disulfide groups.

Embodiment 40 provides the method of any one of Embodiments 1-39, wherein the constitutionally dynamic polymer has the following structure:

$$M\text{-}(Y)_a,$$

wherein at each occurrence M independently has the structure:

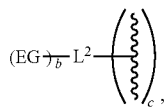

wherein at each occurrence —Y independently has the structure:

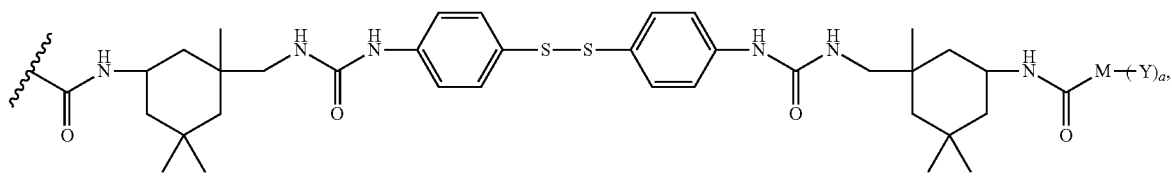

wherein
at each occurrence $L^2$ independently has the structure:

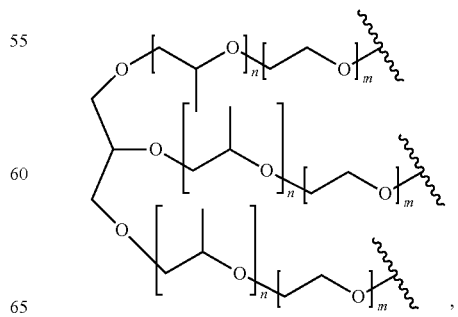

at each occurrence n is independently 0 to 500,
at each occurrence m is independently 0 to 500,
each $L^2$ includes at least one of the propoxy groups having degree of polymerization n and at least one of the ethoxy groups having degree of polymerization m,
at each occurrence $L^2$ independently has a molecular weight of about 250 to about 100,000,
at each occurrence EG is independently chosen from —H and a $(C_1-C_{10})$hydrocarbyl,
at each occurrence the variable a is independently 0 to 3,
at each occurrence of M, b+c is 3, and
the constitutionally dynamic polymer has at least two disulfide groups.

Embodiment 41 provides the method of any one of Embodiments 1-40, further comprising combining the composition with an aqueous or oil-based fluid comprising a drilling fluid, diverting fluid, spotting fluid, pill, cementing fluid, packer fluid, logging fluid, or a combination thereof, to form a mixture, wherein the placing the composition in the subterranean formation comprises placing the mixture in the subterranean formation.

Embodiment 42 provides the method of any one of Embodiments 1-41, wherein at least one of prior to, during, and after the placing of the composition in the subterranean formation, the composition is used in the subterranean formation, at least one of alone and in combination with other materials, as a drilling fluid, diverting fluid, spotting fluid, pill, cementing fluid, packer fluid, logging fluid, or a combination thereof.

Embodiment 43 provides the method of any one of Embodiments 1-42, wherein the composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 44 provides the method of any one of Embodiments 1-43, wherein the placing of the composition in the subterranean formation comprises pumping the composition through a tubular disposed in a wellbore and into the subterranean formation.

Embodiment 45 provides the method of any one of Embodiments 1-44, wherein the placing of the composition in the subterranean formation comprises pumping the composition through a drill string disposed in a wellbore, through a drill bit at a downhole end of the drill string, and back above-surface through an annulus.

Embodiment 46 provides the method of Embodiment 45, further comprising processing the composition exiting the annulus with at least one fluid processing unit to generate a cleaned composition and recirculating the cleaned composition through the wellbore.

Embodiment 47 provides a system for performing the method of any one of Embodiments 1-46, the system comprising:
a tubular disposed in the subterranean formation; and
a pump configured to pump the composition in the subterranean formation through the tubular.

Embodiment 48 provides a system for performing the method of any one of Embodiments 1-46, the system comprising:
a drill string disposed in a wellbore, the drill string comprising a drill bit at a downhole end of the drill string;
an annulus between the drill string and the wellbore; and
a pump configured to circulate the composition through the drill string, through the drill bit, and back above-surface through the annulus.

Embodiment 49 provides a method of treating a subterranean formation, the method comprising:
placing in the subterranean formation a drilling fluid comprising a constitutionally dynamic polymer, wherein the constitutionally dynamic polymer is at least one of a lost-circulation material and a fluid loss control additive, wherein about 0.01 wt % to about 50 wt % of the drilling fluid is the constitutionally dynamic polymer, wherein the constitutionally dynamic polymer has the following structure:

wherein at each occurrence M independently has the structure:

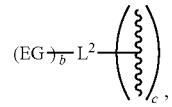

wherein at each occurrence —Y independently has the structure:

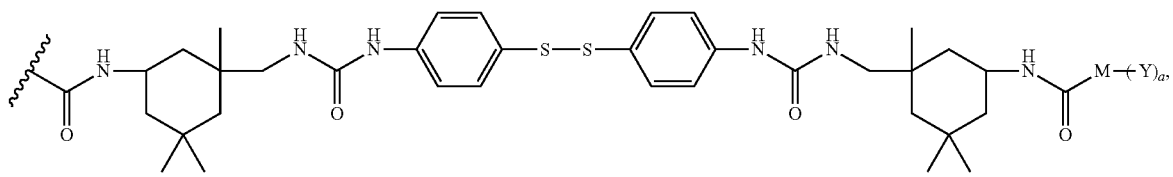

wherein
at each occurrence L² independently has the structure:

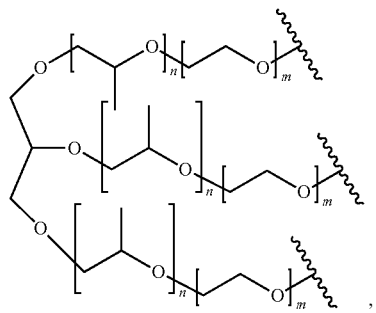

at each occurrence n is independently 0 to 500,
at each occurrence m is independently 0 to 500,
each L² includes at least one of the propoxy groups having degree of polymerization n and at least one of the ethoxy groups having degree of polymerization m,
at each occurrence L² independently has a molecular weight of about 250 to about 100,000,
at each occurrence EG is independently chosen from —H and a substituted or unsubstituted (C$_1$-C$_{20}$) hydrocarbyl interrupted by 0, 1, 2, or 3 groups independently chosen from —O—, —S—, and substituted or unsubstituted —NH—,
at each occurrence the variable a is independently 0 to 3,

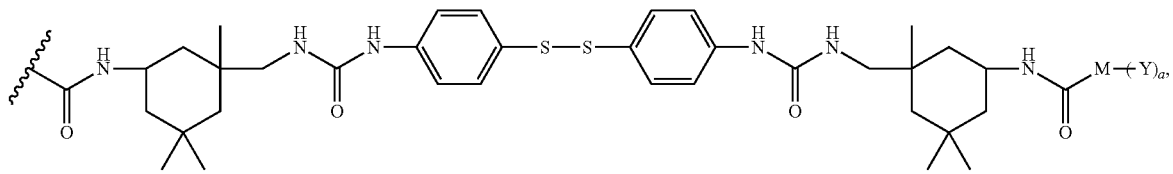

at each occurrence of M, b+c is 3, and
the constitutionally dynamic polymer has at least two disulfide groups.

Embodiment 50 provides a system comprising:
a composition comprising a constitutionally dynamic polymer; and
a subterranean formation comprising the composition therein.

Embodiment 51 provides the system of Embodiment 50, further comprising
a drill string disposed in a wellbore, the drill string comprising a drill bit at a downhole end of the drill string;
an annulus between the drill string and the wellbore; and
a pump configured to circulate the composition through the drill string, through the drill bit, and back above-surface through the annulus.

Embodiment 52 provides the system of Embodiment 51, further comprising a fluid processing unit configured to process the composition exiting the annulus to generate a cleaned drilling fluid for recirculation through the wellbore.

Embodiment 53 provides the system of any one of Embodiments 50-51, further comprising
a tubular disposed in the subterranean formation; and
a pump configured to pump the composition in the subterranean formation through the tubular.

Embodiment 54 provides a composition for treatment of a subterranean formation, the composition comprising:
a constitutionally dynamic polymer.

Embodiment 55 provides the composition of Embodiment 54, wherein the composition is drilling fluid.

Embodiment 56 provides a drilling fluid composition for treatment of a subterranean formation, the drilling fluid comprising:
a constitutionally dynamic polymer comprising at least one disulfide linkage, wherein the constitutionally dynamic polymer is at least one of a lost-circulation material and a fluid loss control additive, wherein about 0.01 wt % to about 50 wt % of the drilling fluid is the constitutionally dynamic polymer, wherein the constitutionally dynamic polymer has the following structure:

M—(Y)$_a$, wherein at each occurrence M independently has the structure:

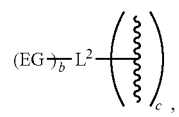

wherein at each occurrence —Y independently has the structure:

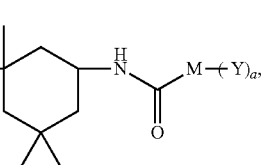

wherein
at each occurrence L² independently has the structure:

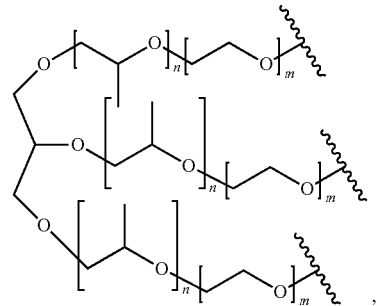

at each occurrence n is independently 0 to 500,
at each occurrence m is independently 0 to 500,
each L² includes at least one of the propoxy groups having degree of polymerization n and at least one of the ethoxy groups having degree of polymerization m,
at each occurrence L² independently has a molecular weight of about 250 to about 100,000, at each occurrence EG is independently chosen from —H and a substituted or unsubstituted $(C_1-C_{20})$ hydrocarbyl interrupted by 0, 1, 2, or 3 groups independently chosen from —O—, —S—, and substituted or unsubstituted —NH—, at each occurrence the variable a is independently 0 to 3, at each occurrence of M, b+c is 3, and the constitutionally dynamic polymer has at least two disulfide groups.

Embodiment 57 provides a method of preparing a composition for treatment of a subterranean formation, the method comprising:

forming a composition comprising a constitutionally dynamic polymer.

Embodiment 58 provides the method of Embodiment 57, wherein the constitutionally dynamic polymer has the following structure:

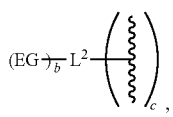

wherein at each occurrence M independently has the structure:

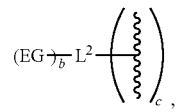

wherein at each occurrence —Y independently has the structure:

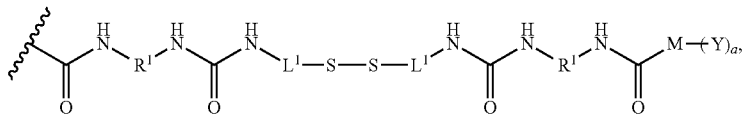

wherein at each occurrence $R^1$ is a substituted or unsubstituted $(C_1-C_{30})$hydrocarbylene, at each occurrence $L^1$ is independently chosen from a bond and a substituted or unsubstituted $(C_1-C_{30})$ hydrocarbylene at least one of interrupted and terminated by 0, 1, 2, or 3 groups independently chosen from —O— and substituted or unsubstituted —NH—, at each occurrence $L^2$ is independently chosen from a substituted or unsubstituted $(C_1-C_{1,000})$hydrocarbyl group at least one of interrupted and terminated by 0 to 500 groups independently chosen from —O— and substituted or unsubstituted —NH—, wherein $L^2$ has a valency of b+c, at each occurrence EG is independently chosen from —H and a substituted or unsubstituted $(C_1-C_{30})$ hydrocarbyl interrupted by 0, 1, 2, or 3 groups independently chosen from —O— and substituted or unsubstituted —NH—, at each occurrence the variable a is independently 0 to 30, at each occurrence of M, b+c is independently 2 to 30, and the constitutionally dynamic polymer has at least two disulfide groups.

Embodiment 59 provides the method of Embodiment 58, wherein the method comprises:

combining $(EG)_b$-$L^2$-$(OH)_c$ with $OCN-R^1-NCO$ to form polymer precursor $(EG)_b$-$L^2$-$(OC(O)NH-R^1-NCO)_c$;

combining the polymer precursor with $H_2N-L^1-S-S-L^1-N_2H$ to form the constitutionally dynamic polymer.

Embodiment 60 provides the composition, method, or system of any one or any combination of Embodiments 1-59 optionally configured such that all elements or options recited are available to use or select from.

What is claimed is:

1. A method of treating a subterranean formation, the method comprising:

placing in the subterranean formation a composition comprising a constitutionally dynamic polymer, wherein the constitutionally dynamic polymer is at least one of a lost-circulation material and a fluid loss control additive, wherein about 0.01 wt % to about 50 wt % of the composition is the constitutionally dynamic polymer, wherein the constitutionally dynamic polymer has the following structure:

$M(-Y)_a$, wherein at each occurrence M independently has the structure:

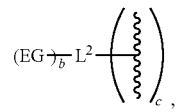

wherein at each occurrence —Y independently has the structure:

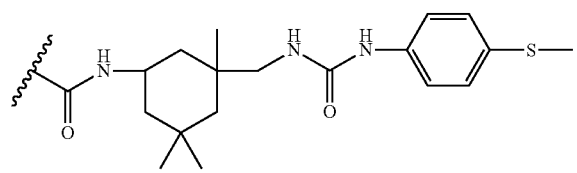

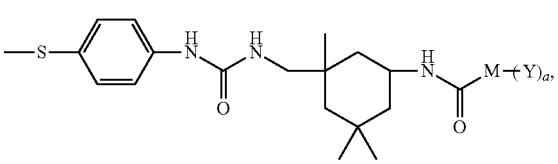

wherein
at each occurrence L² independently has the structure:

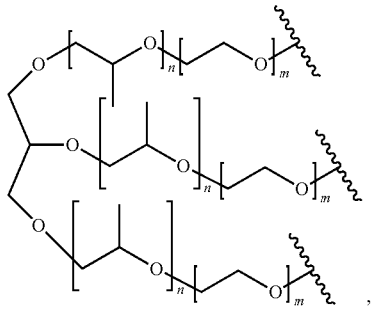

at each occurrence n is independently 0 to 500,
at each occurrence m is independently 0 to 500,
each L² includes at least one of the propoxy groups having degree of polymerization n and at least one of the ethoxy groups having degree of polymerization m,

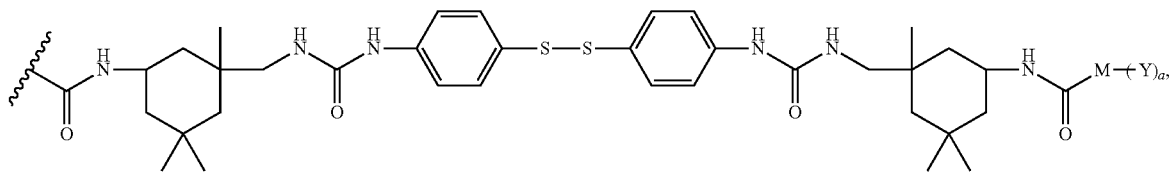

at each occurrence L² independently has a molecular weight of about 250 to about 100,000,
at each occurrence EG is independently chosen from —H and a substituted or unsubstituted ($C_1$-$C_{20}$) hydrocarbyl interrupted by 0, 1, 2, or 3 groups independently chosen from —O—, —S—, and substituted or unsubstituted —NH—,
at each occurrence the variable a is independently 0 to 3,
at each occurrence of M, b+c is 3, and
the constitutionally dynamic polymer has at least two disulfide groups.

2. The method of claim 1, wherein the constitutionally dynamic polymer is a polyurethane.

3. The method of claim 1, wherein the placing of the composition in the subterranean formation comprises pumping the composition through a tubular disposed in a wellbore and into the subterranean formation.

4. The method of claim 1, further comprising allowing the constitutionally dynamic polymer to self-heal in the subterranean formation.

5. The method of claim 4, wherein allowing the constitutionally dynamic polymer to self-heal comprises placing the constitutionally dynamic polymer under a temperature and pressure sufficient to allow it to undergo an intermolecular disulfide rearrangement.

6. The method of claim 4, wherein the temperature sufficient for self-healing is about 100° F. to about 500° F.

7. The method of claim 4, wherein the temperature sufficient for self-healing is at least about 160° F.

8. The method of claim 4, wherein the pressure sufficient for self-healing is about 100 psi to about 50,000 psi.

9. The method of claim 4, wherein the pressure sufficient for self-healing is at least about 300 psi.

10. A system comprising:
a composition comprising a constitutionally dynamic polymer with at least one disulfide linkage, wherein the constitutionally dynamic polymer is at least one of a lost-circulation material and a fluid loss control additive, wherein about 0.01 wt % to about 50 wt % of the drilling fluid is the constitutionally dynamic polymer, wherein the constitutionally dynamic polymer has the following structure:

$$M(Y)_a,$$

wherein at each occurrence M independently has the structure:

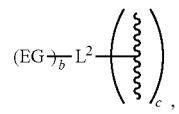

wherein at each occurrence —Y independently has the structure:

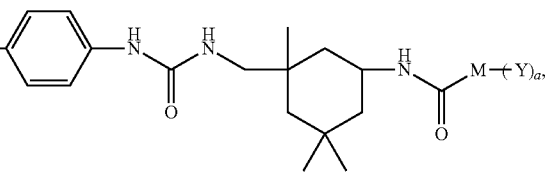

wherein
at each occurrence L² independently has the structure:

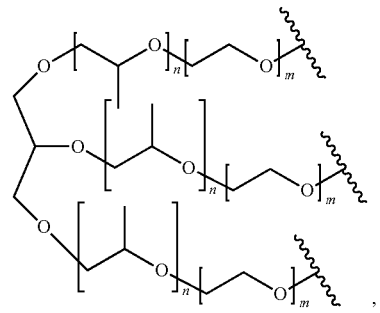

at each occurrence n is independently 0 to 500,
at each occurrence m is independently 0 to 500,
each L² includes at least one of the propoxy groups having degree of polymerization n and at least one of the ethoxy groups having degree of polymerization m,
at each occurrence L² independently has a molecular weight of about 250 to about 100,000,
at each occurrence EG is independently chosen from —H and a substituted or unsubstituted ($C_1$-$C_{20}$)hydrocarbyl interrupted by 0, 1, 2, or 3 groups independently chosen from —O—, —S—, and substituted or unsubstituted —NH—,
at each occurrence the variable a is independently 0 to 3,
at each occurrence of M, b+c is 3, and
the constitutionally dynamic polymer has at least two disulfide groups;

a drill string disposed in a wellbore, the drill string comprising a drill bit at a downhole end of the drill string; and a pump configured to circulate the composition through the drill string.

11. The system of claim 10, further comprising a fluid processing unit configured to process the composition to generate a cleaned drilling fluid for recirculation through the drill string.

12. The system of claim 10, further comprising combining the composition with an aqueous or oil-based fluid comprising a drilling fluid, diverting fluid, spotting fluid, pill, cementing fluid, packer fluid, logging fluid, or a combination thereof.

13. The system of claim 10, wherein the composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

14. A method of preparing a composition for treatment of a subterranean formation, the method comprising:

combining $(EG)_b$-$L^2$-$(OH)_c$ with $OCN$—$R^1$—$NCO$ to form a polymer precursor $(EG)_b$-$L^2$-$(OC(O)NH$—$R^1$—$NCO)_c$;

combining the polymer precursor with $H_2N$-$L^1$-$S$—$S$-$L^1$-$N_2H$ to form a constitutionally dynamic polymer;

wherein the constitutionally dynamic polymer has the following structure:

$$M\text{-}(Y)_a,$$

wherein at each occurrence M independently has the structure:

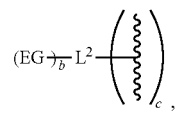

wherein at each occurrence —Y independently has the structure:

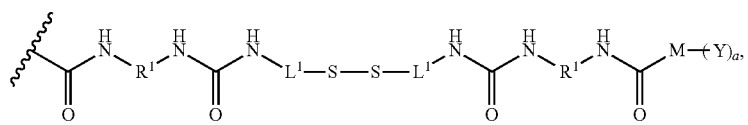

wherein at each occurrence $R^1$ is a substituted or unsubstituted $(C_1$-$C_{30})$hydrocarbylene, at each occurrence $L^1$ is independently chosen from a bond and a substituted or unsubstituted $(C_1$-$C_{30})$ hydrocarbylene at least one of interrupted and terminated by 0, 1, 2, or 3 groups independently chosen from —O— and substituted or unsubstituted —NH—, at each occurrence $L^2$ is independently chosen from a substituted or unsubstituted $(C_1$-$C_{1,000})$hydrocarbyl group at least one of interrupted and terminated by 0 to 500 groups independently chosen from —O— and substituted or unsubstituted —NH—, wherein $L^2$ has a valency of b+c, at each occurrence EG is independently chosen from —H and a substituted or unsubstituted $(C_1$-$C_{30})$ hydrocarbyl interrupted by 0, 1, 2, or 3 groups independently chosen from —O— and substituted or unsubstituted —NH—, at each occurrence the variable a is independently 0 to 30, and at each occurrence of M, b+c is independently 2 to 30.

15. The method of claim 14, wherein the constitutionally dynamic polymer has at least two disulfide groups.

* * * * *